(12) United States Patent
Wilensky et al.

(10) Patent No.: US 9,955,065 B2
(45) Date of Patent: Apr. 24, 2018

(54) DYNAMIC MOTION PATH BLUR USER INTERFACE

(71) Applicant: Adobe Systems Incorporated, San Jose, CA (US)

(72) Inventors: Gregg D. Wilensky, Pacific Palisades, CA (US); Nathan A. Carr, San Jose, CA (US); Alan L. Erickson, Highlands Ranch, CO (US); Yuyan Song, Milpitas, CA (US); Manish Kumar, Hapur (IN); Bradee Rae Evans, Alameda, CA (US); Sarah A. Kong, Cupertino, CA (US); Michael J. Orts, Santa Clara, CA (US); Meredith L. Stotzner, San Jose, CA (US); Heather M. Dolan, San Francisco, CA (US); Yukie Takahashi, Newark, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 247 days.

(21) Appl. No.: 14/470,785

(22) Filed: Aug. 27, 2014

(65) Prior Publication Data
US 2016/0063669 A1 Mar. 3, 2016

(51) Int. Cl.
*G09G 5/00* (2006.01)
*H04N 5/232* (2006.01)

(52) U.S. Cl.
CPC ..... *H04N 5/23216* (2013.01); *H04N 5/23229* (2013.01); *H04N 5/23254* (2013.01); *H04N 5/23277* (2013.01)

(58) Field of Classification Search
CPC .................................. G06T 11/60; G06T 19/00
USPC .......................................................... 345/619
See application file for complete search history.

(56) References Cited

U.S. PATENT DOCUMENTS

| | | |
|---|---|---|
| 9,723,204 B2 | 8/2017 | Wilensky et al. |
| 9,779,484 B2 | 10/2017 | Wilensky et al. |
| 2002/0027555 A1 | 3/2002 | Mori |
| 2003/0161014 A1 | 8/2003 | Tobita et al. |
| 2005/0062751 A1 | 3/2005 | Cazabon et al. |
| 2006/0227144 A1 | 10/2006 | Bleiweiss |
| 2007/0097260 A1* | 5/2007 | Takeuchi ............... G09G 5/397 348/441 |
| 2007/0120858 A1 | 5/2007 | Meinds |
| 2009/0179898 A1 | 7/2009 | Bond |
| 2009/0231465 A1* | 9/2009 | Senba ................ H04N 5/23248 348/229.1 |

(Continued)

OTHER PUBLICATIONS

VirtualRig Studio, "Creating curved motion blur", https://www.youtube.com/watch?v=jbo3BHdDmHw, Jan. 13, 2010.*

(Continued)

*Primary Examiner* — Jin Ge
(74) *Attorney, Agent, or Firm* — Wolfe-SBMC

(57) ABSTRACT

Dynamic motion path blur techniques are described. In one or more implementations, paths may be specified to constrain a motion blur effect to be applied to a single image. A variety of different techniques may be employed as part of the motion blur effects, including use of curved blur kernel shapes, use of a mesh representation of blur kernel parameter fields to support real time output of the motion blur effect to an image, use of flash effects, blur kernel positioning to support centered or directional blurring, tapered exposure modeling, and null paths.

16 Claims, 29 Drawing Sheets

(56) References Cited

U.S. PATENT DOCUMENTS

| | | | |
|---|---|---|---|
| 2009/0244300 A1 | 10/2009 | Levin et al. | |
| 2009/0245685 A1 | 10/2009 | Makii | |
| 2010/0149184 A1 | 6/2010 | Pepper et al. | |
| 2011/0169829 A1* | 7/2011 | Berger | G06T 19/00 345/423 |
| 2011/0181606 A1* | 7/2011 | Sumner | G06T 13/00 345/474 |
| 2012/0033096 A1 | 2/2012 | Jelinek | |
| 2012/0293538 A1* | 11/2012 | Ording | G06T 13/80 345/592 |
| 2013/0113950 A1 | 5/2013 | Park et al. | |
| 2013/0229435 A1* | 9/2013 | Intwala | G06T 5/20 345/647 |
| 2014/0250522 A1* | 9/2014 | Wang | G06F 21/36 726/17 |
| 2014/0333669 A1* | 11/2014 | Stich | G06T 5/002 345/634 |
| 2016/0035068 A1 | 2/2016 | Wilensky et al. | |
| 2016/0048952 A1 | 2/2016 | Tezaur et al. | |
| 2016/0063670 A1 | 3/2016 | Wilensky et al. | |

OTHER PUBLICATIONS

Bleex, "Road" Tutorial—Bleex Motion Blur, https://www.youtube.com/watch?v=dWXMVgTMJ8Q, May 7, 2012.*

Photoshop CS6, After Effects CS6- Advanced Rotoscoping and Strobe Masking Effect Tutorial- for Music Videos, https://www.youtube.com/watch?v=coYxpBlkyvA, Dec. 10, 2012.*

"VirtualRig", Website, retrieved from <http://www.virtualrig-studio.com/> on Aug. 7, 2014, 14 pages.

"VirtualRig Studio Software", Facebook page, retrieved from <https://www.facebook.com/virtualrigstudio> on Aug. 7, 2014, 2 pages.

"Road Tutorial—Bleex Motion Blur", YouTube Video, retrieved from <https://www.youtube.com/watch?v=dWXMVgTMJ8Q&list=UUQPNcJ-mJFwirN-SwzHWIbA> on Aug. 7, 2014, May 7, 2012, 2 pages.

"Jitter Tutorial—Bleex Motion Blur", YouTube video, retrieved from <https://www.youtube.com/watch?v=hlUR0800K3o&list=UUQPNcJ-mJFwirN-SwzHWIbA> on Aug. 7, 2014, Jul. 9, 2012, 2 pages.

"Preview Workflow Tutorial—Bleex Motion Blur", YouTube Video, retrieved from <https://www.youtube.com/watch?v=bVrzOfLE2fo&list=UUQPNcJ-mJFwirN-SwzHWIbA> on Aug. 7, 2014, Sep. 8, 2012, 2 pages.

"Curve Editing Tutorial—Bleex Motion Blur", YouTube Video, retrieved from <https://www.youtube.com/watch?v=maX8u0gLIaO&list=UUQPNcJ-mJFwirN-SwzHWIbA> on Aug. 7, 2014, Sep. 8, 2012, 2 pages.

"Velocity Editing Tutorial—Bleex Motion Blur", YouTube Video, retrieved from <https://www.youtube.com/watch?v=SQGO5ncbEH0&list=UUQPNcJ-mJFwirN-SwzHWIbA> on Aug. 7, 2014, Sep. 8, 2012, 2 pages.

"Bleex", Bleex Website, retrieved from <http://getbleex.com/> on Aug. 7, 2014, 20 pages.

"VirtualRig Studio—Motion Blur—Photoshop Tutorial", YouTube Video, retrieved from <https://www.youtube.com/watch?v=17W_U7G9SB0> on Aug. 7, 2014, Dec. 10, 2013, 3 pages.

"VirtualRig / Motion Blur In Photoshop", RETUTPRO, retrieved from <http://www.retutpro.com/tutorial/photoshop-virtual-rig/> on Aug. 7, 2014, May 2, 2014, 6 pages.

Sonders, "Falken Motorsports Porsche Photoshoot—No Rig No Problem", Fstoppers, retrieved from <https://fstoppers.com/automotive/falken-motorsports-porsche-photoshoot-no-rig-no-problem-8499> on Aug. 7, 2014, Dec. 2, 2013, 9 pages.

Sterling, "Limestand's Photoshop and Virtual Rig Studio Video", YouTube Video, retrieved from <https://www.youtube.com/watch?v=o1u5zkhVdKU> on Aug. 7, 2014, Jan. 29, 2013, 2 pages.

"Non-Final Office Action", U.S. Appl. No. 14/451,229, dated Sep. 8, 2016, 16 pages.

"Pre-Interview Communication", U.S. Appl. No. 14/470,818, dated Jun. 23, 2016, 3 pages.

"First Action Interview Office Action", U.S. Appl. No. 14/470,818, dated Oct. 27, 2016, 17 pages.

"VirtualRig Studio Realistic motion blur simulation for CGI and car photography User Manual Version 2.2", Retrieved from <www.virtualrig-studio.com/ .../VirtualRig_Studio_2.2_User_Manual.pdf>, 2009-2011, 17 pages.

"Final Office Action", U.S. Appl. No. 14/470,818, dated Feb. 27, 2017, 11 pages.

"Final Office Action", U.S. Appl. No. 14/451,229, dated Jan. 27, 2017, 20 pages.

"Notice of Allowance", U.S. Appl. No. 14/470,818, dated Apr. 26, 2017, 5 pages.

"Supplemental Notice of Allowance", U.S. Appl. No. 14/451,229, dated Aug. 31, 2017, 2 pages.

"Corrected Notice of Allowance", U.S. Appl. No. 14/470,818, dated May 12, 2017, 2 pages.

"Notice of Allowance", U.S. Appl. No. 14/451,229, dated Jun. 30, 2017, 9 pages.

* cited by examiner

1600

1700

1800

2800 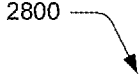

2802
Display a path in a user interface of a computing device, the path input by a user through interaction with the user interface, in which:

2804
the path is formed from a plurality of points, each of the points being selectable by a user through interaction with the user interface to modify the path

2806
the path is configured to constrain a motion blur to be applied as a motion blur effect to an image

2808
Responsive to receipt of one or more inputs via the user interface involving movement of at least one point of the path from a first location to a second location in the user interface, modify the display of the path in the user interface by the computing device to include the at least one point at the second location

*Fig. 28*

DYNAMIC MOTION PATH BLUR USER INTERFACE

BACKGROUND

Motion blur in an image may be used to give an appearance of movement, such as to an object within the image and/or a device used to capture the image, e.g., a camera. For example, even though modern image capture devices may be utilized to quickly capture an image, these images are still captured over a range of time. Therefore, movement of the camera and/or objects within an image scene being captured may blur within the image and thus a user may perceive this blurring as movement within the image. The greater the amount of movement in the image, the greater the amount of blur.

Image processing techniques have been developed to process an image simulate this motion blur effect, such as to give an appearance of movement of objects within the image or movement of the camera itself as described above. However, conventional techniques utilized to generate a motion blur are resource intensive and typically require specialized knowledge to implement as these conventional techniques are not intuitive to a user.

SUMMARY

Dynamic motion path blur techniques are described. In one or more implementations, paths may be specified to constrain a motion blur effect to be applied to a single image. A variety of different techniques may be employed as part of the motion blur effects. One such technique supports use of curved blur kernel shapes. In another technique, a mesh representation of blur kernel parameter fields may be utilized to separate image resolution from motion field generation and thus support real time output of the motion blur effect to an image.

Further, a flash effect may be included as part of a motion blur effect to simulate strobe flashes along with ambient light continuous exposures. The ambient and flash effect may be blended together to enable control of the mix of flash effect and ambient light. In another example of a flash effect, a single strobe flash may be simulated at the endpoint of the motion blur trajectory. When mixed with a continuous ambient light contribution, this may be used to simulate a camera technique of rear curtain flash synchronization.

Tapered exposure modeling is also described that supports tapering of exposure, which may be performed for ambient and/or flash contributions over the duration of the exposure. Techniques are also described to control the positioning of a blur kernel. For example, centered blurring may be employed for stable effects, non-centered blurring for directional motion, and so on. Yet further, null path techniques may be employed to avoid motion blur in the vicinity of the path.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 28 is a flow diagram depicting a procedure in an example implementation in which a path used to constrain a motion blur effect is configured to support direct interaction with the path.

DETAILED DESCRIPTION

Overview

Dynamic motion path blur techniques are described. In one or more implementations, a user interface is configured to support inputs describing a path, such as through input via a gesture, cursor control device, or otherwise. The path may be utilized to constrain a motion blur effect to be applied to an image. Additionally, techniques are described in which calculation of the motion blur may be performed in a domain separate from a domain of the image, such as in a mesh domain (e.g., a triangle mesh), and thus calculation of a motion field may be performed independently of an image size. In this way, real time image processing and interaction may be supported that was not possible using conventional techniques.

A variety of additional functionality may be supported through use of the described dynamic motion blur path techniques. For example, flash effects may be supported to increase a pixel intensity at one or more points in time in a motion blur trajectory of a specified path. This may be performed to support slow shutter effects, rear curtain flash synchronization, tapered exposure modeling, and so forth. In another example, positioning of blur kernels may be specified, such as to support centered blurring or non-centered blurring to support an appearance of directional motion, and so on. In a further example, null path techniques are described in which a path may be specified to avoid inclusion of a motion blur effect in a vicinity of the path. This may be performed as a form of masking without use of a raster mask.

The dynamic motion blur path techniques may also support a variety of user interface functionality. For example, a user may interact directly with point of the specified path itself, rather than interact with "off-path" controls and thus support intuitive user interaction. In this way, a user may "grab anywhere" along the path to reform the path as desired. Additionally, this interaction may be performed in real time as inputs are received and thus a user may view application of the motion blur effect in real time as the inputs are provided. Further, the user interface may support an ability of a user to specify a shape of a blur kernel associated with the path. The user, for instance, may specify shapes at endpoints of the path describing the motion blur, such as a curved blur kernel shape to support simulation of physical motion blur. A variety of other examples are also contemplated, further discussion of which may be found in relation to the following sections.

In the following discussion, an example environment is first described that may employ the blending techniques described herein. Example procedures are then described which may be performed in the example environment as well as other environments. Consequently, performance of the example procedures is not limited to the example environment and the example environment is not limited to performance of the example procedures.

Example Environment

Figure 1:
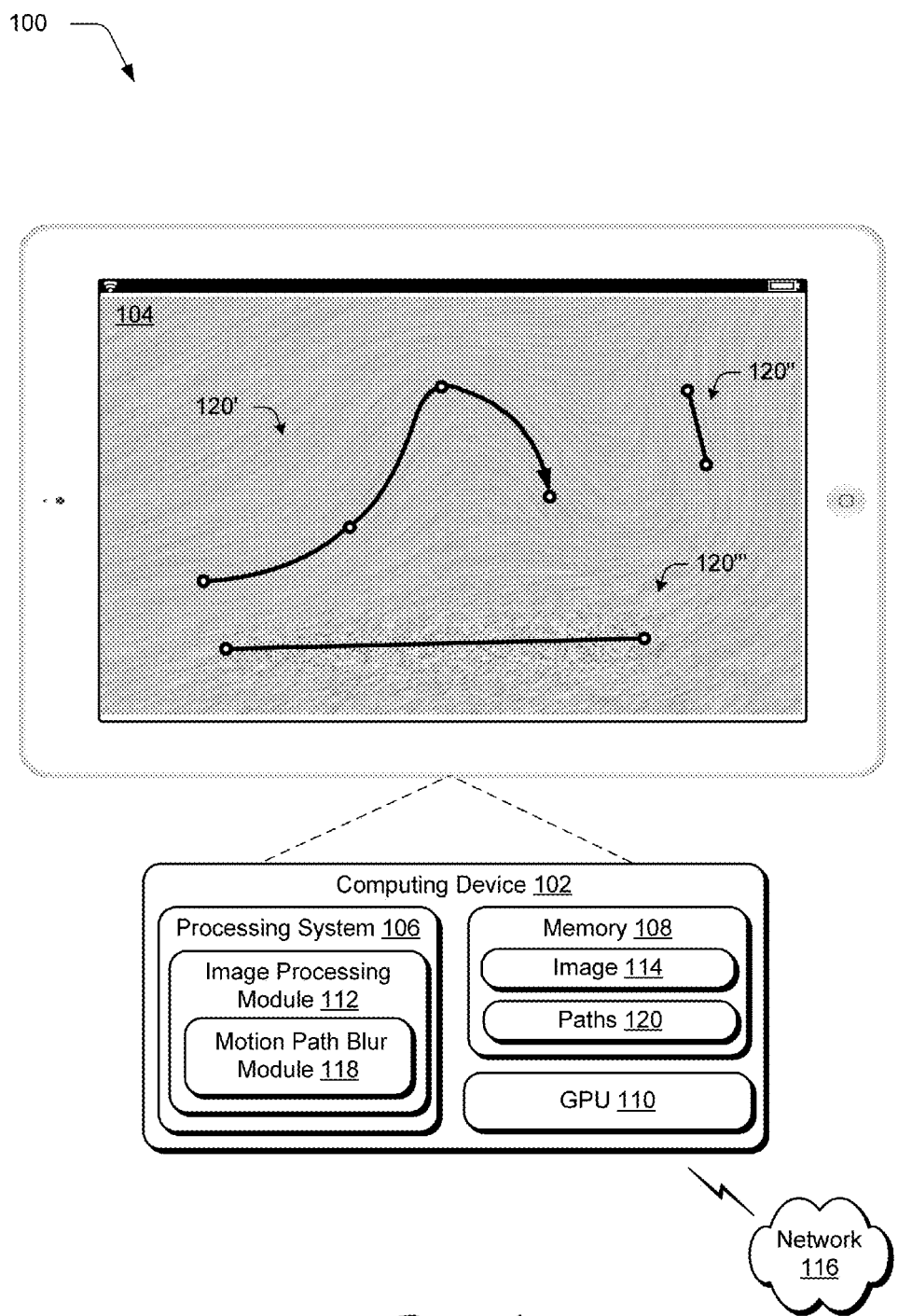
FIG. 1 is an illustration of an environment in an example implementation that is operable to employ motion path blur techniques described herein.

FIG. 1 is an illustration of an environment 100 in an example implementation that is operable to employ motion path blur techniques described herein. The illustrated environment 100 includes a computing device 102, which may be configured in a variety of ways. The computing device 102, for instance, may be configured as a desktop computer, a laptop computer, a mobile device (e.g., assuming a handheld configuration such as a tablet or mobile phone), and so forth. For example, as illustrated the computing device 102 is configured in a mobile configuration as a tablet that includes a display device 104 having touchscreen functionality that is configured to recognize touch inputs, such as those from a user's hand.

The computing device 102 also includes a processing system 106 (which may one or more CPUs), a computer-readable storage medium that is illustrated as a memory 108 although other confirmations are also contemplated as further described below, and a graphics processing unit 110 (GPU) that is configured to perform one or more rendering operations separate from the processing system 106, a result of which is output for display on the display device 104.

Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 34.

The computing device 102 is illustrated as including an image processing module 112. The image processing module 112 is representative of functionality to process an image 114, an example of which is illustrated as output via a user interface on the display device 104. Although illustrated as implemented on the computing device 102, the functionality of the image processing module 112 may be implemented in a variety of ways, such as remotely via a web service of a service provider that is accessible "on the cloud" via the network 116, distributed between the service provider and the computing device 102, and so on.

An example of image processing functionality of the image processing module 112 is represented by a motion path blur module 118. The motion path blur module 118 is representative of functionality to generate a motion blur effect for application to the image 114. The motion blur effect is constrained in this example using one or more paths 120 that describe how the motion blur effect is to be applied to the image 114.

In the illustrated example, a user interface is illustrated as being displayed by the display device 104 that includes a plurality of examples of paths 120', 120", 120'". The paths may be input in a variety of ways, such as via a gesture that is detected via touchscreen functionality of the display device 104 through use of one or more capacitive sensors. Other examples of inputs that may be received to specify a path are also contemplated, such as via a cursor control device (e.g., a mouse), data points received from a spreadsheet, sensor readings, presentation software, and so on.

The user interface includes examples of a variety of types of paths that may be specified. Paths 120' and 120" illustrate examples in which a motion blur effect is applied. As may be noticed in the figure, the effect of the motion blur effect lessens for these paths 120', 120" as the distance increases between the pixels in the image and the paths 120', 120". In other words, the closer a pixel is to the paths 120', 120" the greater the motion blur effect from that path.

Path 120'" is an example of a null path in which kernel shapes are zeroed out, which restricts blur from being applied in the vicinity the path 120'", e.g., blur from other paths 120', 120.' In this way, the null path may act as a form of masking and reduce and even prevent the motion blur effect specified by paths 120', 120" from affecting pixels in the vicinity of path 120.'" The paths 120 and motion blur effect may be described and generated in a variety of ways, further discussion of which may be found in the following and shown in a corresponding figure.

Figure 2:
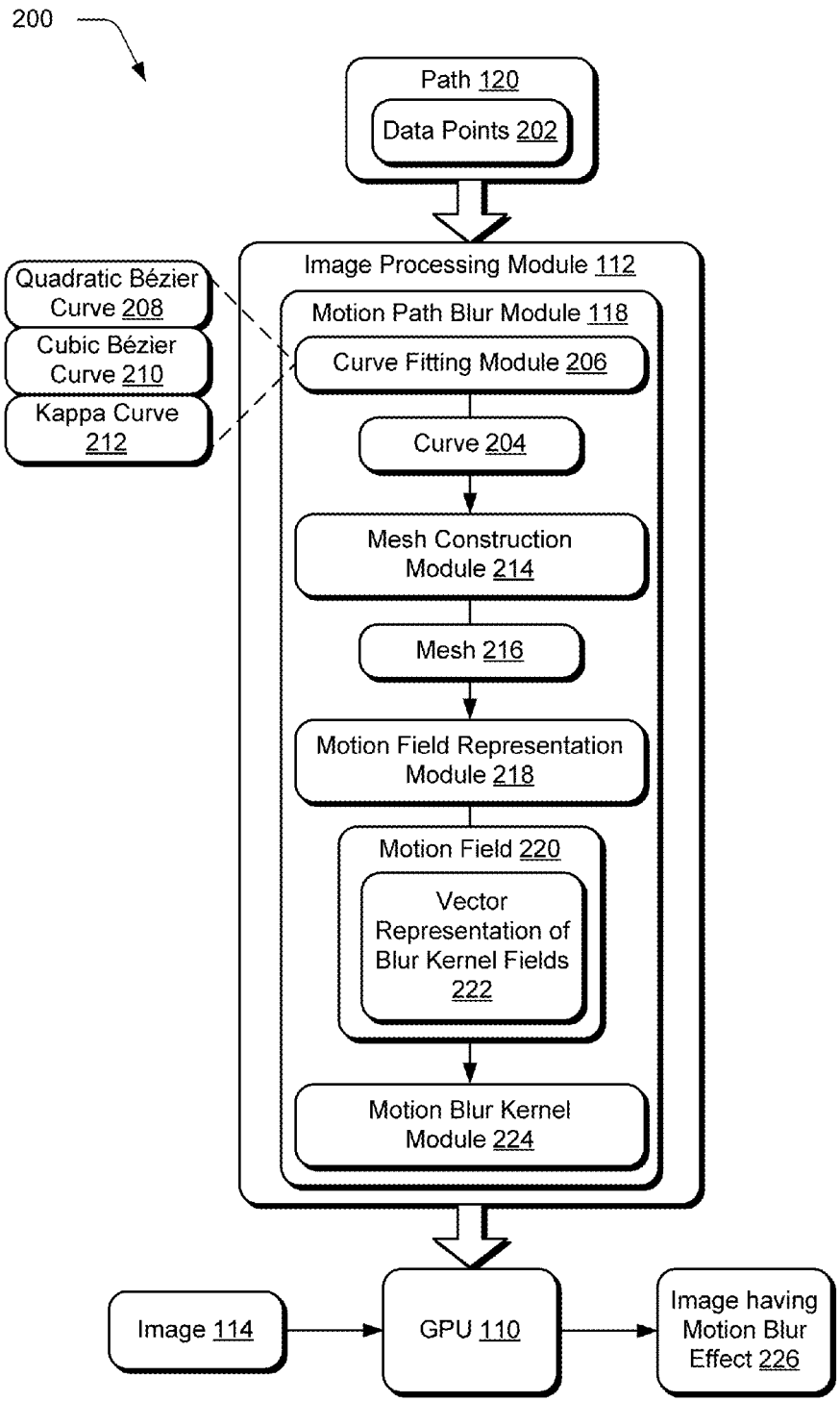
FIG. 2 depicts a system in an example implementation showing a motion path blur module of FIG. 1 in greater detail.

FIG. 2 depicts a system 200 in an example implementation showing the motion path blur module 118 of FIG. 1 in greater detail. The image processing module 112 receives as an input a description of a path 120 using a plurality of data points 202 in this example, although other examples are also contemplated as previously described. This may be performed in a variety of ways, such as through use of a curve drawing and editing tool. As part of the specification of the path 120, for instance, the motion path blur module 118 may employ techniques to fit a curve 204 to data points 202 input by a user to describe the path 120, functionality of which is represented by a curve fitting module 206.

A variety of different curve fitting techniques may be employed, such as through use of a quadratic or cubic Bezier curve 208, 210 fitting techniques, use of kappa curve 212 technology that supports direct interaction along points of the curve, and so on. For example, the quadratic or cubic Bezier curve 208, 210 fitting techniques may employ controls that are positioned off of the curve to control characteristics of the curve, e.g., bend and so forth. In the kappa curve 212 example, however, a user may interact directly with the points on the curve 204 itself, e.g., to select and drag the points to define and reshape the curve 204 as desired through interaction with a user interface.

The motion path blur module 118 is also illustrated as including a mesh construction module 214 that is representative of functionality to construct a mesh 216 describing the path 120 as well as points off the path that describe how the motion blur effect is to be constrained by the path 120. The mesh 216 may be utilized to support real time output of a motion blur effect as inputs of the path 120 are received. In this way, a user may view the effect of the motion blur path on the image 114 as it is received.

Returning again to FIG. 1, for instance, it may be observed that the motion blur effect is generally smooth across the image in that the effect does not change rapidly in a local area. At the same time, it may also be observed that accuracy of the motion blur effect is to increase the closer the pixels in the image are to the paths 120', 120", 120.'" Accordingly, the mesh 216 of FIG. 2 may be constructed to include edge vertices and non-edge vertices. The edge vertices collectively describe each edge of the path 120 and thus are "pixel accurate" for pixels that lie along the path, i.e., describe every pixel included in the path 120. The non-edge vertices describe one or more points of the mesh away from the path 120 and are sparser than a number of pixels for an image 120 that are not included on the path.

Figure 3:
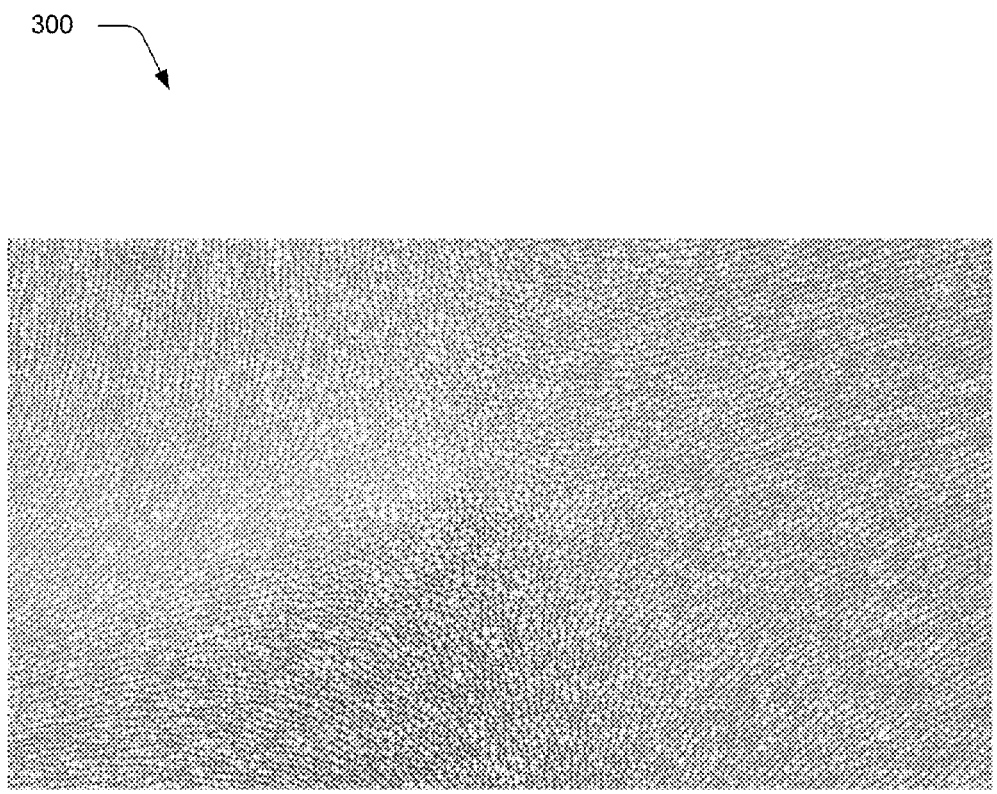
FIG. 3 is an illustration of an example of a triangle mesh.

An example 300 of a mesh 216 is shown in FIG. 3. In this example 300, a triangular mesh is shown although meshes employing other shapes are also contemplated, such as rectangles, polygons, and so forth. The triangular mesh may thus include a plurality of non-edge vertices that are fewer in number than a number of pixels included outside of the path and within the mesh. Accordingly, the edge vertices may be used to accurately describe the path 120 with the non-edge vertices usable to describe points of an image away from the path, which may be utilized to improve processing efficiency as further described below.

Returning again to FIG. 2, a motion field representation module 218 of the motion path blur module 118 may then accept the mesh 216 as an input and apply constraints to the edge vertices which represent blur kernel parameters along the path. The blur kernel parameters for non-edge vertices (i.e., for vertices of the mesh 216 not along the path) may be found by a distance-weighted average of the values from the edge vertices, i.e., the constraint vertices. For example, a Green's function approach may be employed by using a weight that is inversely proportional to the square of the distance from the constraint point (e.g., the edge vertices) to an evaluation point (e.g., the non-edge vertices of the mesh 216). This may be used to generate a motion field 220 that provides a smooth field of kernel shape parameters across the mesh 216. An evaluation of field values at points that are interior to the mesh vertices of the triangles may be calculated using standard interpolation techniques, such as a linear interpolation in a Barycentric coordinate system.

This technique (apart from the Barycentric interpolation) produces a motion field 220 having a vector representation of the blur kernel fields 222. It should be noted that these techniques are not tied directly to a size of the image 114 and thus the motion field 220 may be solved in a separate domain (e.g., the mesh 216 space) that is independent from a domain of the image 114. In this way, real time output of the motion blur effect to the image may be supported which was not possible using conventional techniques due to high computational resource consumption and may do so with increased accuracy over these conventional techniques.

For example, an image 114 may have a size of hundreds of megapixels and even include Giga-pixel sizes. Through use of the mesh 216, edge vertices may be utilized to exactly encode edges of a path 120 input by a user and as such may perfectly represent the edges of the path 120, no matter the resolution. Away from the paths, the non-edge vertices (e.g., the triangle mesh vertices shown in FIG. 3) may be used, which are sparser than the number of pixels in the image 114. Thus, the motion field 220 may be calculated independent of the image size using a fewer number of points.

A motion blur kernel module 224 may then transfer the motion field 220 to the image 114 for processing by the GPU 110 of FIG. 1 to generate an image having a motion blur effect 226 using classic GPU rendering technology to any image of any size. In this way, the image having the motion blur effect 226 may be output in real time as inputs are received that specify the path, e.g., the path 120 may be formed and/or moved around by a user and the user may view the motion blur effect applied to the image in real time as the path is formed or moved.

Blur kernels are shapes which determine how the image is blurred at a given point, i.e., pixel. In one or more implementations, simple quadratic Bezier curves are used for a base implementation to describe the blur kernel shapes although other description configurations are also contemplated. This produces the effect of blurring in which the camera moves and/or the object in the scene moves either in a straight line or along a simple parabolic trajectory. However, by enabling this basic shape to vary from pixel to pixel across the image, as determined by the blur kernel fields, a rich set of blur simulations may be supported.

The following is an example of blur kernel field determination. The blur kernels are described by quadratic Bezier curves as described above. The two-dimensional curve coordinates, "r(t)," of such a curve may be parameterized in terms of a time variable, "t," whose values range from zero to one:

$$r(t)=(1-t)^2 r0+2t(1-t)rm+t^2 r1$$

where "r0" is the origin, the trajectory starting point, the coordinate value when time is equal to zero. The variable "r1" is the trajectory end point, the value when time is equal to one. And "rm" is the (m)idle control point which controls the slopes of the curve.

For directional (non-centered) blurring, an origin for the motion blur averaging (convolution) is the pixel of interest. For centered blurring, the origin is taken as the geometric center of each of the sampled trajectory points. In either case, the origin, "r0," of the reference Bezier curve above is not utilized, and reference to it may be removed as follows:

$$r(t)-r0=2t(1-t)rm0+t^2 r10,$$

where rm0=rm−r0 and r10=r1−r0.
This may be utilized to arrive at two 2-dimensional displacement vectors, "rm0" and "r10," which totally describe the quadratic Bezier trajectory displacements.

As a point of notation, these displacement vectors can be denoted as follows:

$$r(t)-r0=dr(t)=(dx(t),dy(t)).$$

Each of these displacement vectors is specified with particular values at the endpoints of each motion blur path placed upon the image. Along the path these vectors are linearly interpolated. A non-linear interpolation may also be used, such as a logarithmic, power law, or any other function that changes value between the two endpoints.

Having triangulated the image into a triangular mesh (using a standard triangle routine) with the path endpoints placed at vertices in the mesh and sampled points along the paths also specified as mesh vertices, a triangular mesh is formed with a number of constraints specifying the four numbers (two 2-dimensional vectors) of the quadratic Bezier kernel displacements. These numbers describe the motion trajectories and hence define a blur to be applied at each point for which a value may be determined.

So, the problem reduces to determining the values for these four number fields everywhere in the image 114 given the specified constraints at the vertices along the paths. In order to interpolate the field values everywhere, interpolation is performed initially at vertices in the triangular mesh. These may be calculated by a Green's function approach, which is to say that the value at any vertex (or any other point for that matter) is produced by averaging each of the constraint values with a weight (the Green's function) which falls off with distance. In practice, a quadratic spatial falloff has been found to produce good results. A cubic falloff also produces good results, and it should be realized that in general any function of distance (between the point under evaluation and the point representing the location of the constrained field value) may be utilized.

The two 2-dimensional trajectory vectors may be represented as six (=2*3) components in which each vector is broken into a magnitude and a cosine and sine of its angle, e.g., relative to the horizontal direction. Subtleties with interpolation may also be employed to ensure intuitive behavior when a path endpoint is "zeroed out" to indicate that blurring is not to occur there. This may include avoidance of averaging of the angular contributions of such points and instead solely incorporating the length magnitude components. In this way, these zero-motion points only induce shrinking of the motion nearby and do not distort the directions of motion.

A motion blur effect may then be calculated using the blur kernel field values. For example, the value for the blurred image at any pixel may be determined by first finding the quadratic Bezier blur kernel parameters at that pixel and then averaging pixels displaced from the selected pixel by the interpolated quadratic Bezier. In other words, a weighted average of image intensity values may be calculated along the determined curve. The weighting may be uniform or may be a function of curve length or of sample number. For a tapered implementation that is described in greater detail later, a simple exponentially decaying or growing function of the pixel sample number, "n," may be chosen relative to the total number of samples along the curve, "N."

$$weight(n)=taper\_gain*n/N$$

The parameter "taper_gain" is used to control how much tapering is applied. Typical values lie between −10 and +10. A value of zero produces no tapering—a flat exposure simulation.

Figure 23:
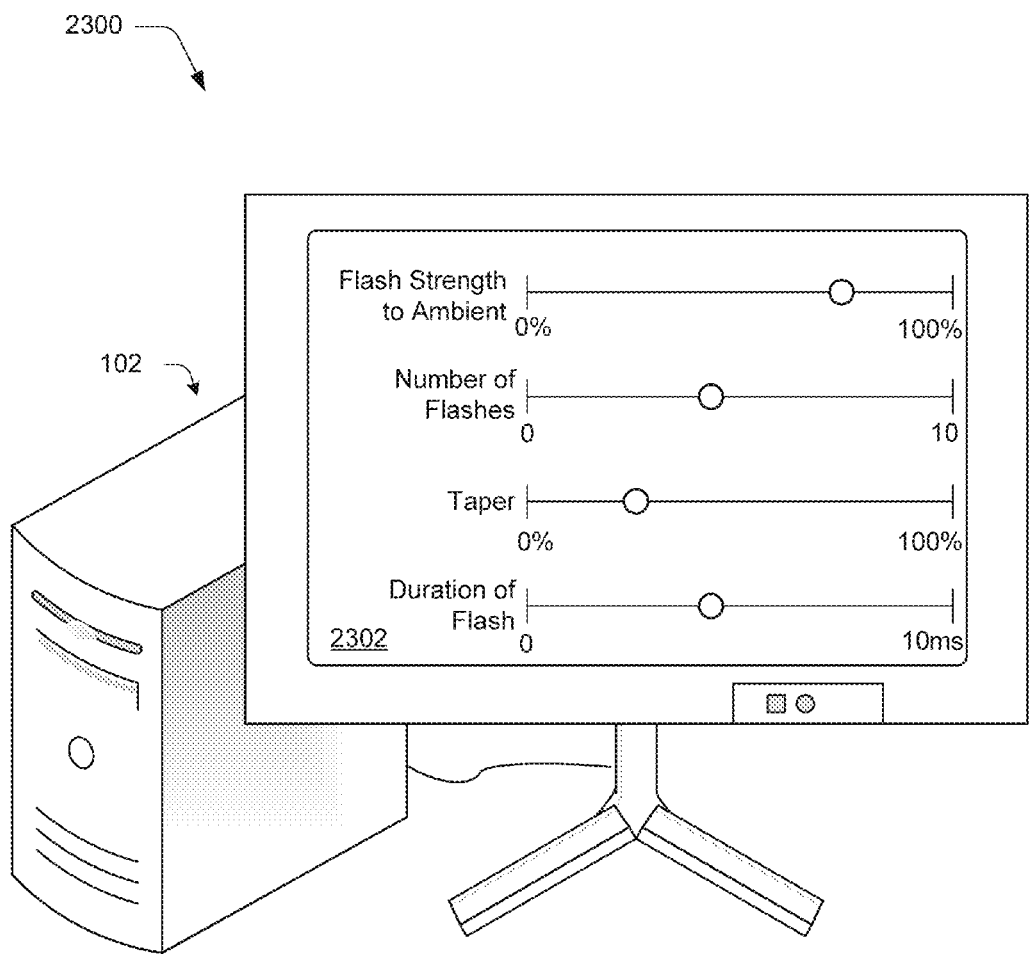
FIG. 23 depicts an example implementation of a user interface output by the computing device of FIG. 1 to specify characteristics of flash and taper effects.

Given these weights and the kernel trajectory, (dx(t), dy(t)), descried above, a sampling of points are averaged along this trajectory to produce the final motion blurred value:

$$Image\_value(x,y)=average[Image\_value(x',y')*weight(n)]$$

where
x'=x'(tn)=x+dx (tn),
y'=y'(tn)=y+dy (tn),
The values "tn" are the sampled trajectory times (which lie between zero and one). The times may be chosen to be uniformly spaced when producing a flash effect, with the total number of samples, "N," chosen as the number of flashes, e.g., from a "strobe," through interaction with a user interface as shown in FIG. 23. For the dense sampling which produces the continuous (ambient light) contribution the samples may be chosen so that the arc-length along the trajectory is a constant value; a typical such value is 0.5 pixel units.

Figure 4:
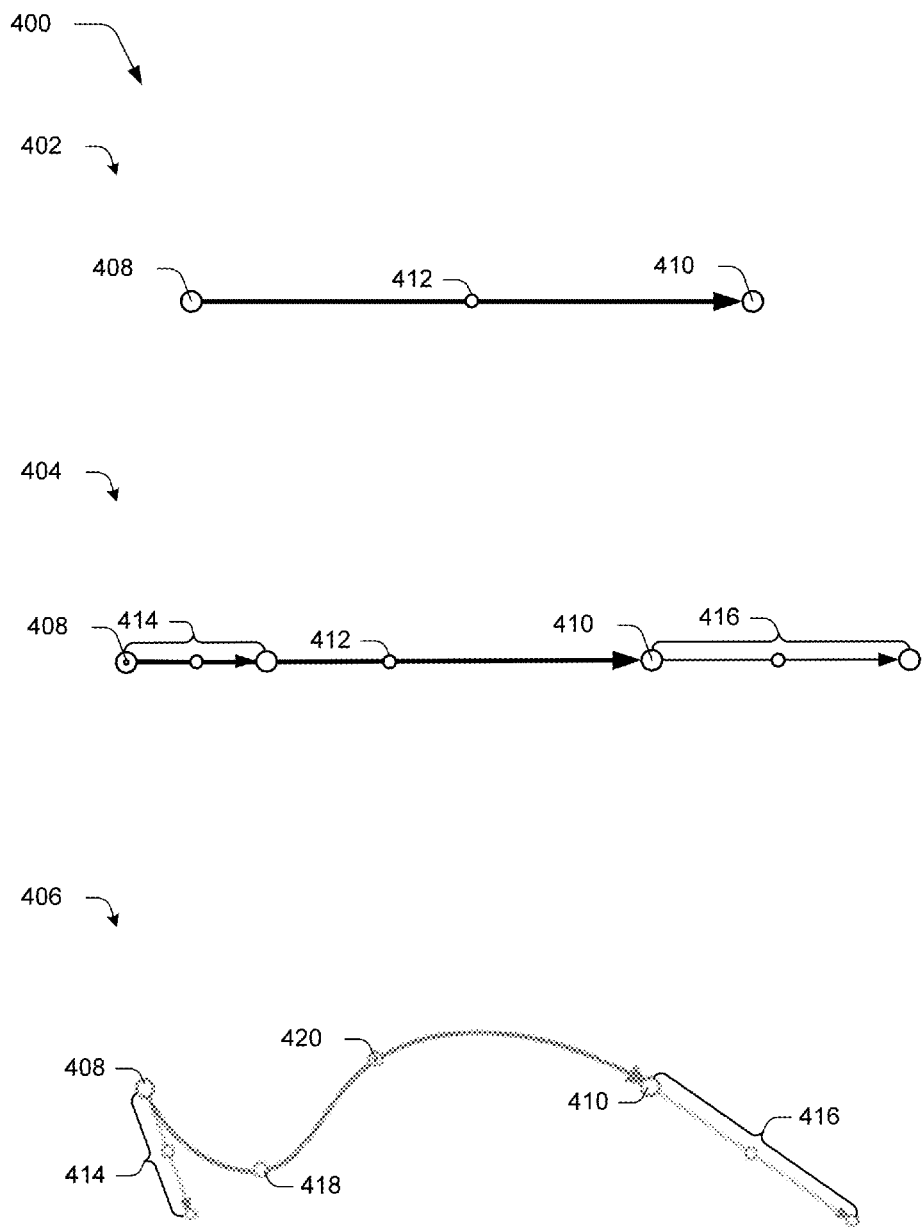
FIG. 4 depicts an example implementation of paths that may be utilized to constrain a motion blur effect.

FIG. 4 depicts an example implementation 400 of paths that may be utilized to constrain a motion blur effect. This example implementation 400 includes first, second, and third path 402, 404, 406 examples. The first path 402 includes endpoints 408, 410 and a middle point 412. The first path 402 is a straight line that may be described in a variety of ways, e.g., quadratic Bezier curve 208, cubic Bezier 210, a kappa curve 212, and so on. In the kappa curve 212 example, user interaction may be performed at any point along the path and thus the middle point 412 merely indicates that interaction is available, but this interaction is not limited to that point. The first example 402 includes an arrow showing a direction of blur, and thus may be utilized to describe a motion blur trajectory as input by a user. For instance, the user may draw the first path 402 beginning at endpoint 408 and then ending at endpoint 410.

In the second path 404 example, endpoints 408, 410 are included as before. Additionally, kernel shapes 414, 416 are also input through interaction with the endpoints 408, 416, which are also straight line segments in this instance. The kernel shape 416 has a longer length than kernel shape 414, indicating a greater magnitude of motion blur. For instance, this may be used to apply a motion blur effect in which portions of a scene captured by image 114 toward the right are imaged with a greater amount of speed and larger motion, and hence are more blurred in the direction of the arrow of the kernel shape 416 in comparison with kernel shape 414.

Thus, the endpoints 408, 410 define the path (i.e., the path of the motion blur) and set constraints as to what the actual blur shapes are at each point along the path. The kernel shapes 414, 416 indicate the shape of the blur kernel at each of the two path endpoints.

The third path 406 example shows a curved motion path. The third path 406 includes endpoints 408, 410 like above. Handles 418, 420 are also included that correspond to points that lie "on" the third path 406, which are included to indicate to a user that direct interaction with the path may be performed, such as to "click and drag" any of the points between the endpoints 408, 410 to arrive at a desired shape. Thus, as previously described interaction is not limited to the handles 418, 420 in some examples, e.g., the kappa curve example. Kernel shapes 414, 416 are also defined at the endpoints 408, 410. This curved path has straight line motion blurs applied at each endpoint 408, 410, with the blur kernels staying tangential to the blur path.

Figure 5:
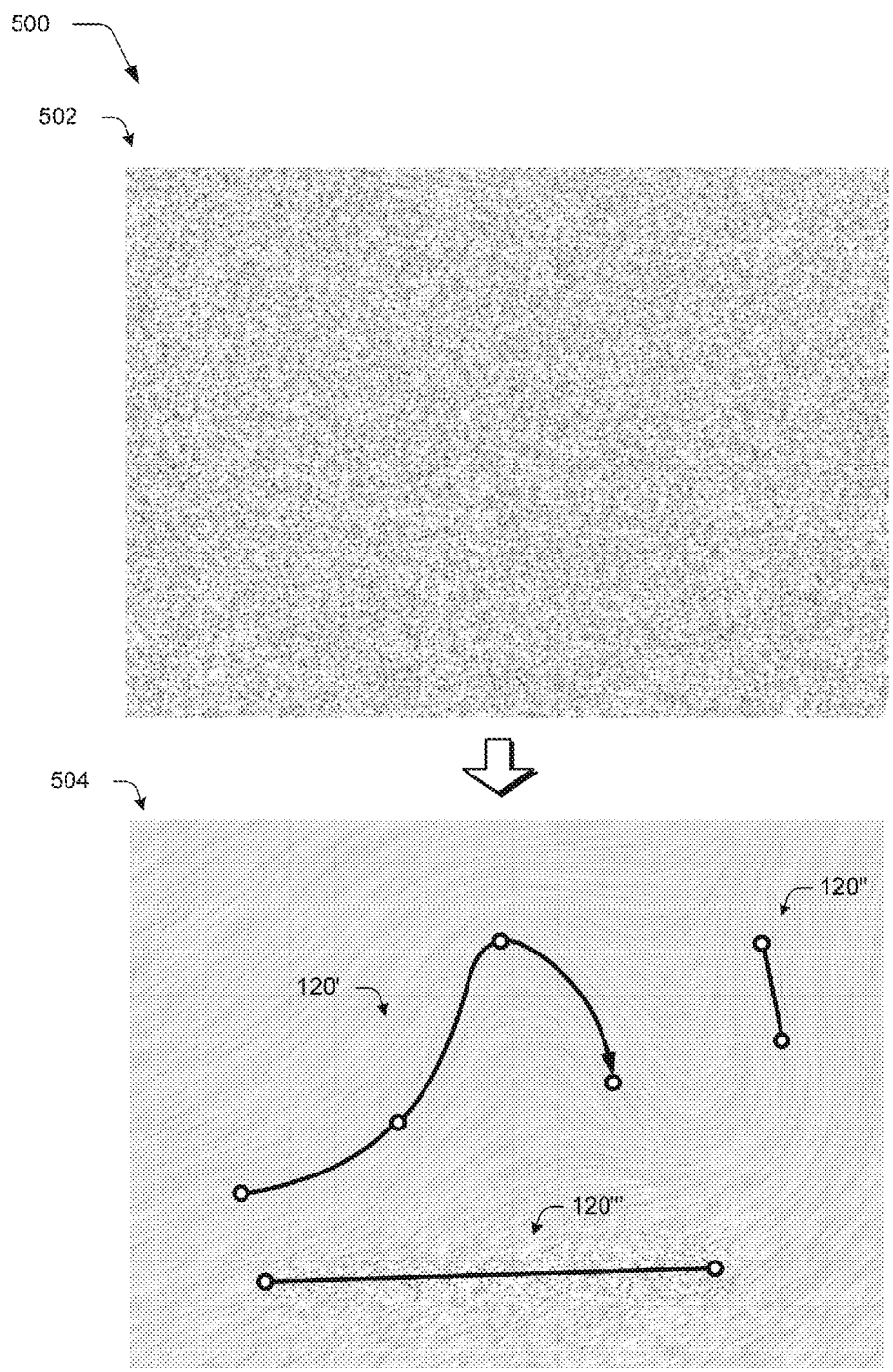
FIG. 5 depicts an example implementation of processing of an image to produce a motion blur effect.

FIG. 5 depicts an example implementation 500 of processing of an image to produce a motion blur effect. An image 502 in this example is a "noise" image showing a generally randomized collection of pixels. This image 502 is then processed to produce an image having a motion blur effect 504 that is constrained using paths 120', 120", 120''' as previously described in relation to FIG. 1. Paths 120', 120" specify a motion blur effect, the intensity of which lessens for pixels as the distance from the paths increases. Path 120''' is a null path (e.g., a motion blur effect that is configured to cancel out other motion blurs) in which kernel shapes are "zeroed out," which prevents the application of the motion blur effect to the vicinity of the path 120". As illustrated, this null effect also lessens as the distance from the path 120''' increases.

Figure 6:
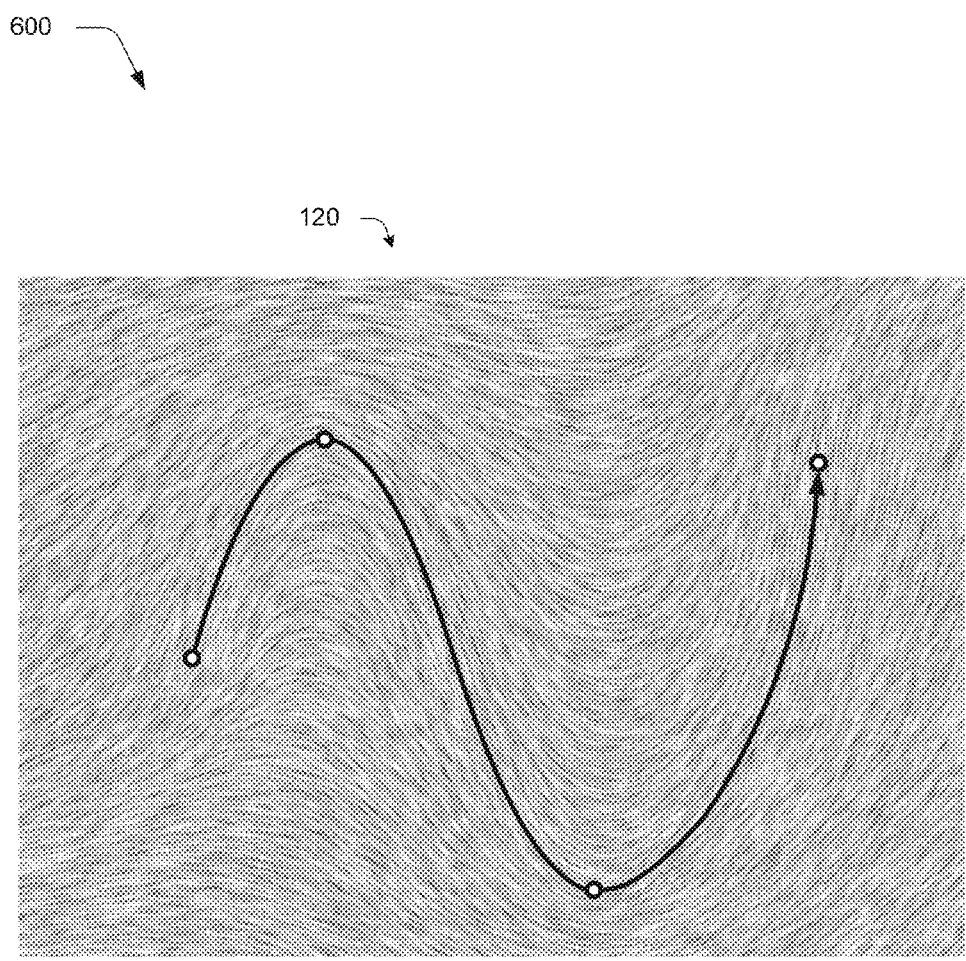
FIG. 6 depicts another example implementation of processing of an image to produce a motion blur effect.

FIG. 6 depicts another example implementation 600 of processing of an image to produce a motion blur effect. In this example, the path is input as a wave and has straight blur kernel shapes that are specified at the endpoints (not shown). Through comparison with the image 502 of FIG. 5, the effect of the path and corresponding motion blur effect may be readily visualized.

Figure 7:
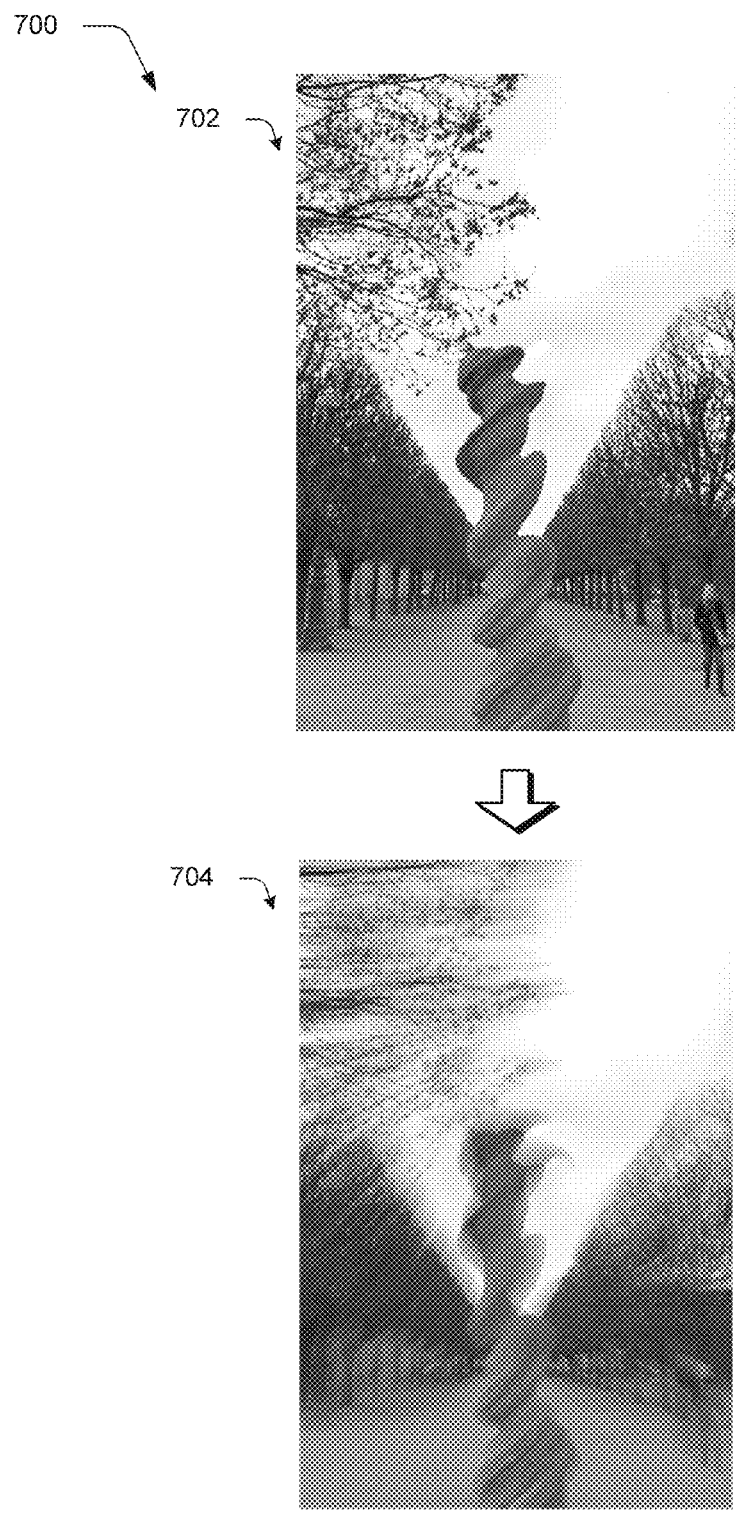
FIG. 7 depicts an example implementation of an image of a statue and a processed image to which a motion blur effect is applied.
Figure 8:
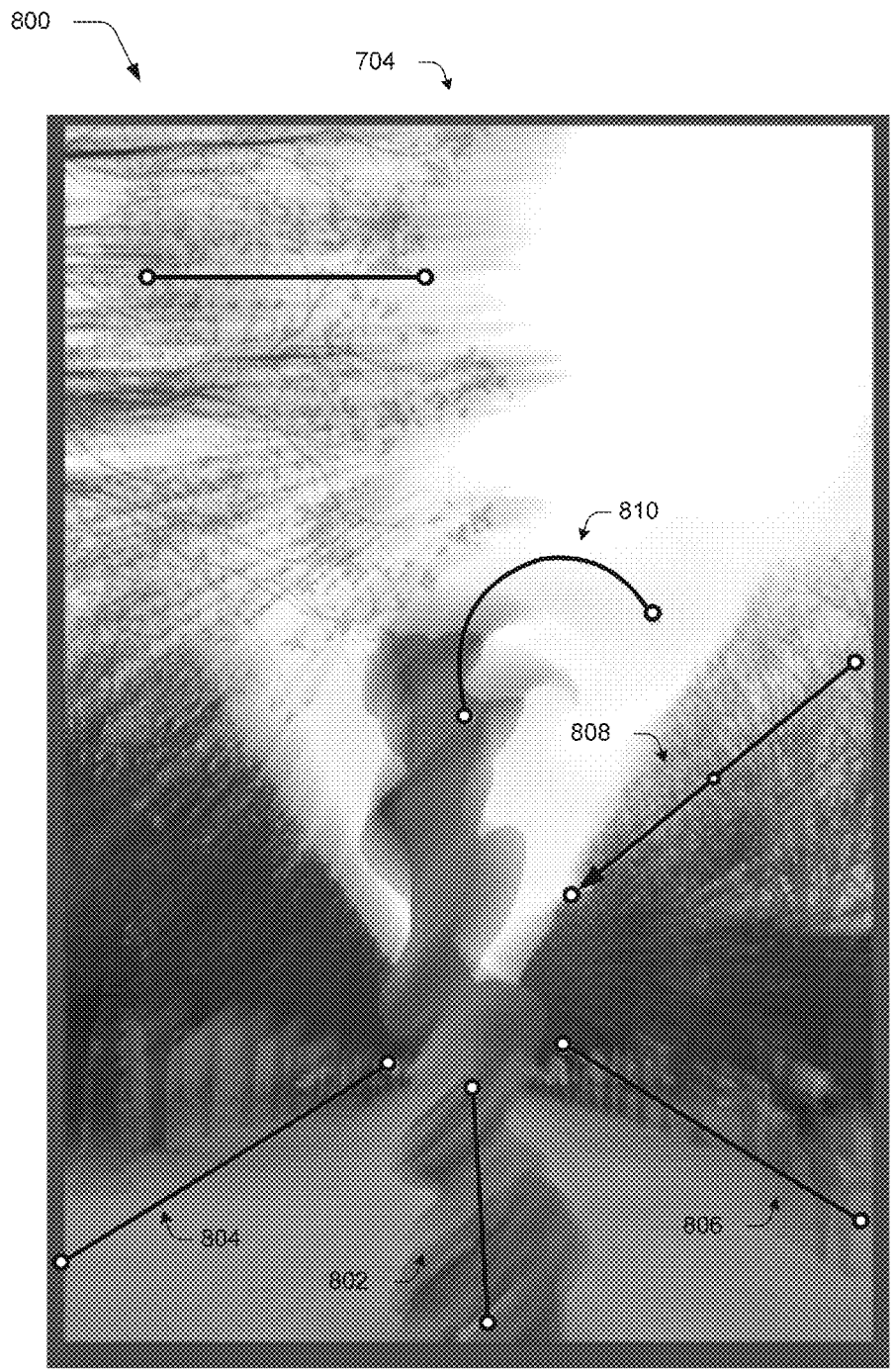
FIG. 8 depicts an example implementation showing paths used to generate the processed image of FIG. 7.

FIG. 7 depicts an example implementation 700 of an image 702 of a statue and a processed image 704 to which a motion blur effect is applied. FIG. 8 depicts an example implementation 800 showing paths used to generate the processed image 704. In this example, path 802 is configured such that endpoints of the path have a motion that is forced to zero, i.e., no motion there. The effect of a camera moving into a scene of the image 704 (e.g., towards the central vanishing point) is produced by the paths 804, 806, 808 that start with some blur at the bottom and head toward the vanishing point in the middle in which the zero blur is forced. A curved path 810 is also included around a top of the statue, which has a bit of curvature in the associated kernel to provide a playful effect.

Figure 9:
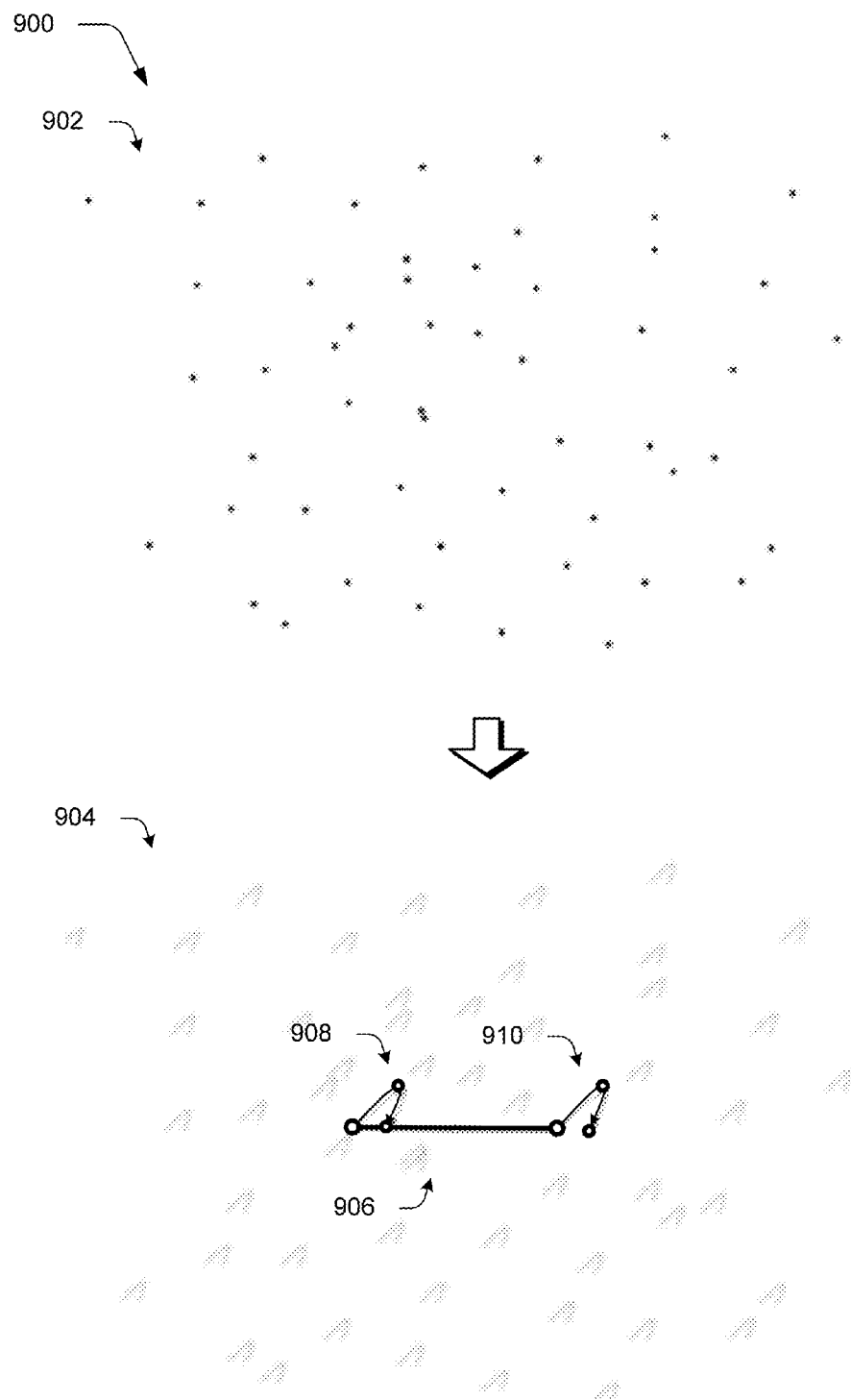
FIG. 9 depicts an example implementation of curved blur kernel shapes.

FIG. 9 depicts an example implementation 900 of curved blur kernel shapes. Image 902 includes an example set of dots. This image 902 is then processed to form image 902 having a motion blur effect. This effect is specified using a straight path 906 with curved kernel shapes 908, 910 specified through interaction with the endpoints of the path 906. The effect of the path 906 and the curved kernel shapes may be readily viewed through comparison of the images 902, 904.

Figure 10:
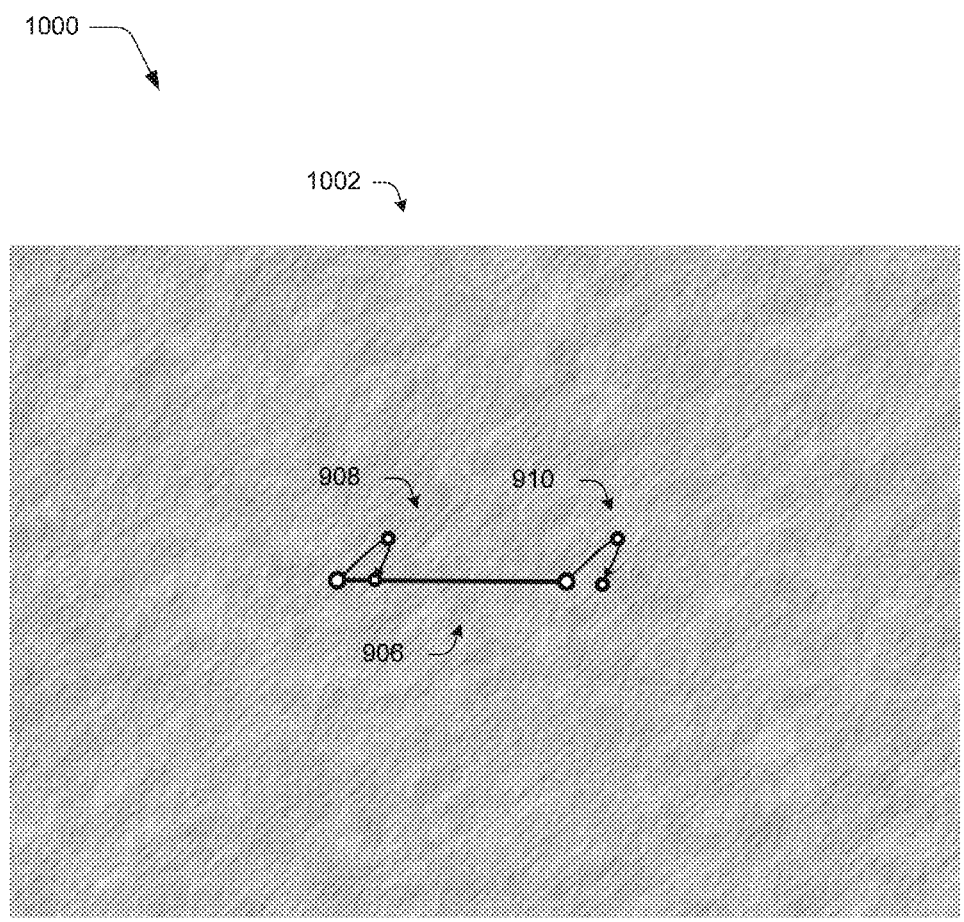
FIG. 10 depicts an example implementation of curved blur kernel shapes to a noise image of FIG. 5.

FIG. 10 depicts an example implementation 1000 of curved blur kernel shapes to the noise image 502 of FIG. 5. In this example, the same path 906 and kernel shapes 908, 910 are applied to form image 1002 having a motion blur effect. Thus, this is also an example in which a path may be utilized to generate a motion field 220 independently of the images, which may then be applied to different images without recalculation of the motion field through standard GPU processing techniques as previously described.

Figure 11:
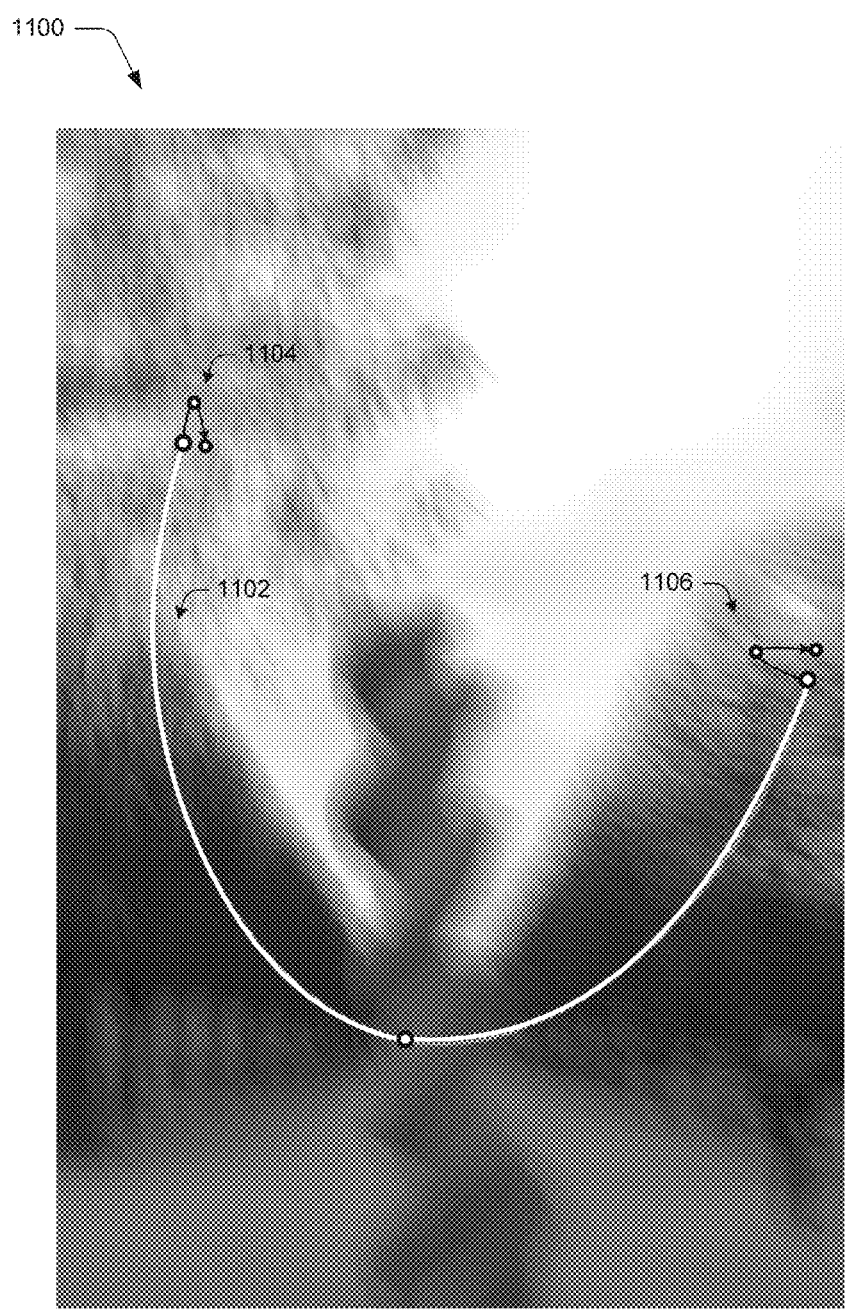
FIG. 11 depicts an example implementation of a motion blur effect specified using a curved path and curved blur kernel to an image of FIG. 7.

FIG. 11 depicts an example implementation 1100 of a motion blur effect specified using a curved path 1102 and curved blur kernel 1104, 1106 to the image 702 of the statue of FIG. 7. The motion blur effect in this example may be compared with the motion blur effect applied to image 704 of FIG. 8 to visualize differences caused by differences in the paths and kernel shapes.

Figure 12:
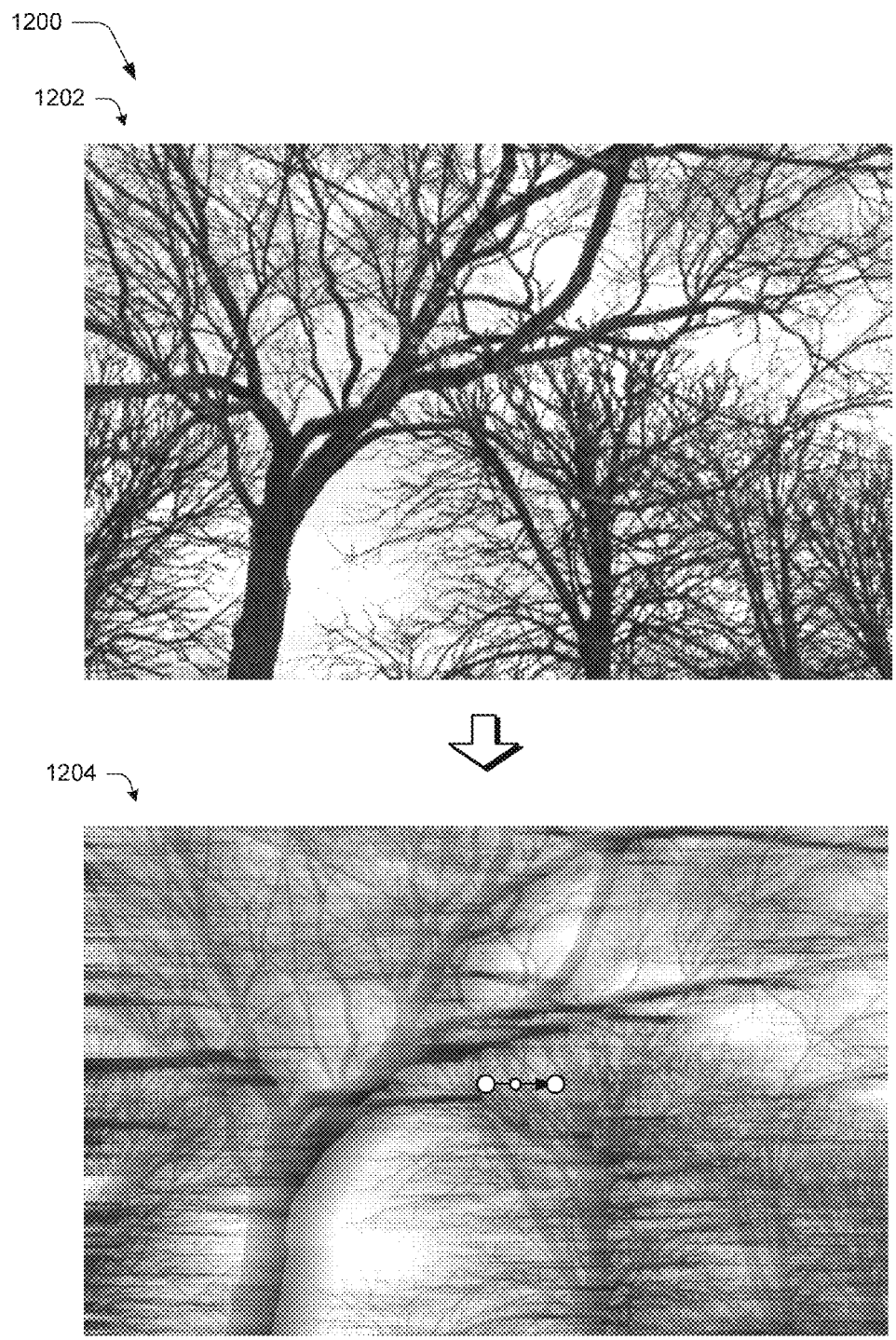
FIG. 12 depicts an example implementation of a flash effect used in conjunction with a motion blur effect.

FIG. 12 depicts an example implementation 1200 of a flash effect used in conjunction with a motion blur effect. A flash effect may be utilized to control illumination of an image's contribution during one or more points in a motion blur trajectory defined by the previously described path. For example, an image 1202 is shown that does not have a motion blur effect. This image may be processed to increase intensity at one or more points in time during exposure of the image along with the described motion of the motion blur, i.e., in the motion blur trajectory. In this way, the contribution of the image at those points in time may be increased relative to other points in time in the motion blur trajectory, the simulated exposure of the motion blur effect.

The illustrated example, image 1202 is processed using a motion blur effect that includes a flash effect to produce image 1204. Image 1204 is an example of what is commonly referred to as rear curtain synchronized flash with motion blur. In this instance, a point in time in a motion blur trajectory is specified for a flash effect as occurring toward an end of ambient light exposure. This combination of flash with ambient light exposure is also often called a slow shutter effect and the placement of the flash toward the end of the exposure is called rear curtain synchronization. Thus, the flash effect may be modeled as part of a normal continuous motion blur simulation of the motion blur effect. As shown in the image 1204, the greater illumination contribution during that point in the motion blur trajectory described by the path 1206 may result in clear outlines of the original image.

Figure 13:
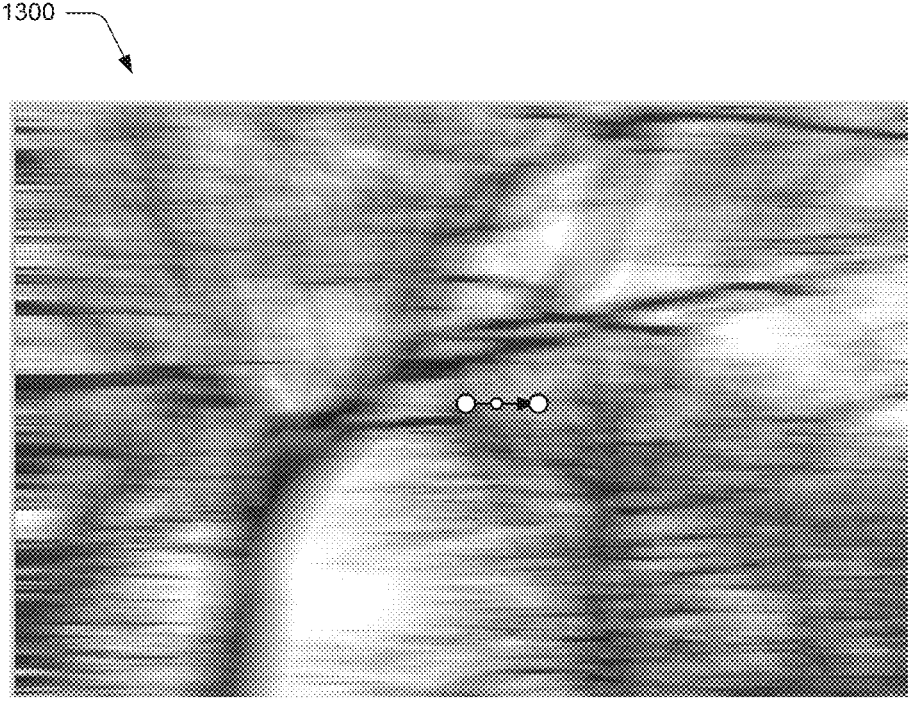
FIG. 13 depicts an example implementation of application of a motion blur effect to an image of FIG. 12 is shown without a flash effect.

FIG. 13 depicts an example implementation of application of a motion blur effect to the image 1202 of FIG. 12 is shown without a flash effect. In this example, the same motion blur effect is applied as was applied to image 1202 to result in image 1204 of FIG. 12. However, in this example a flash effect is not specified. Thus, as is readily apparent through comparison of image 1204 with image 1300, the original outlines of the tree are no longer present as caused by the flash effect.

Figure 14:
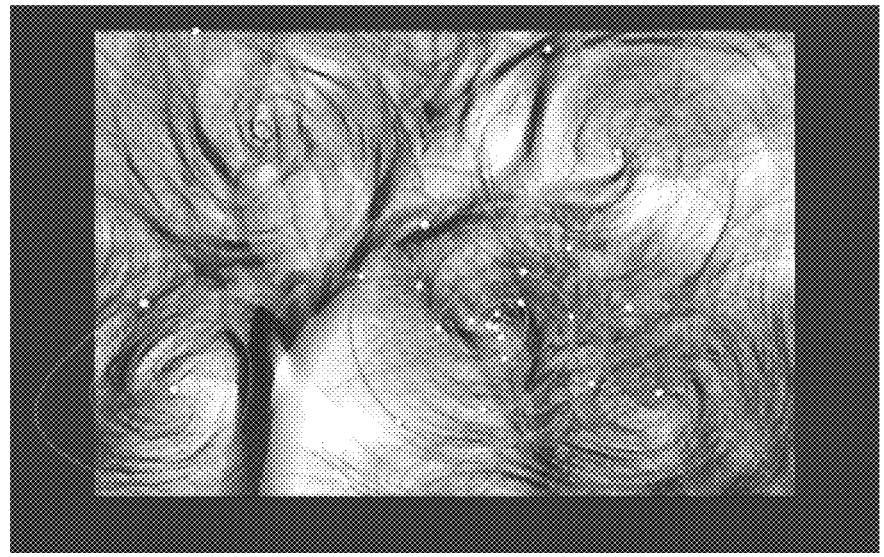
FIG. 14 depicts an example of a spiral motion blur effect.

A variety of other motion blurs may also be specified, even spiral motion blur effects as shown in the example 1400 of FIG. 14.

Figure 15:
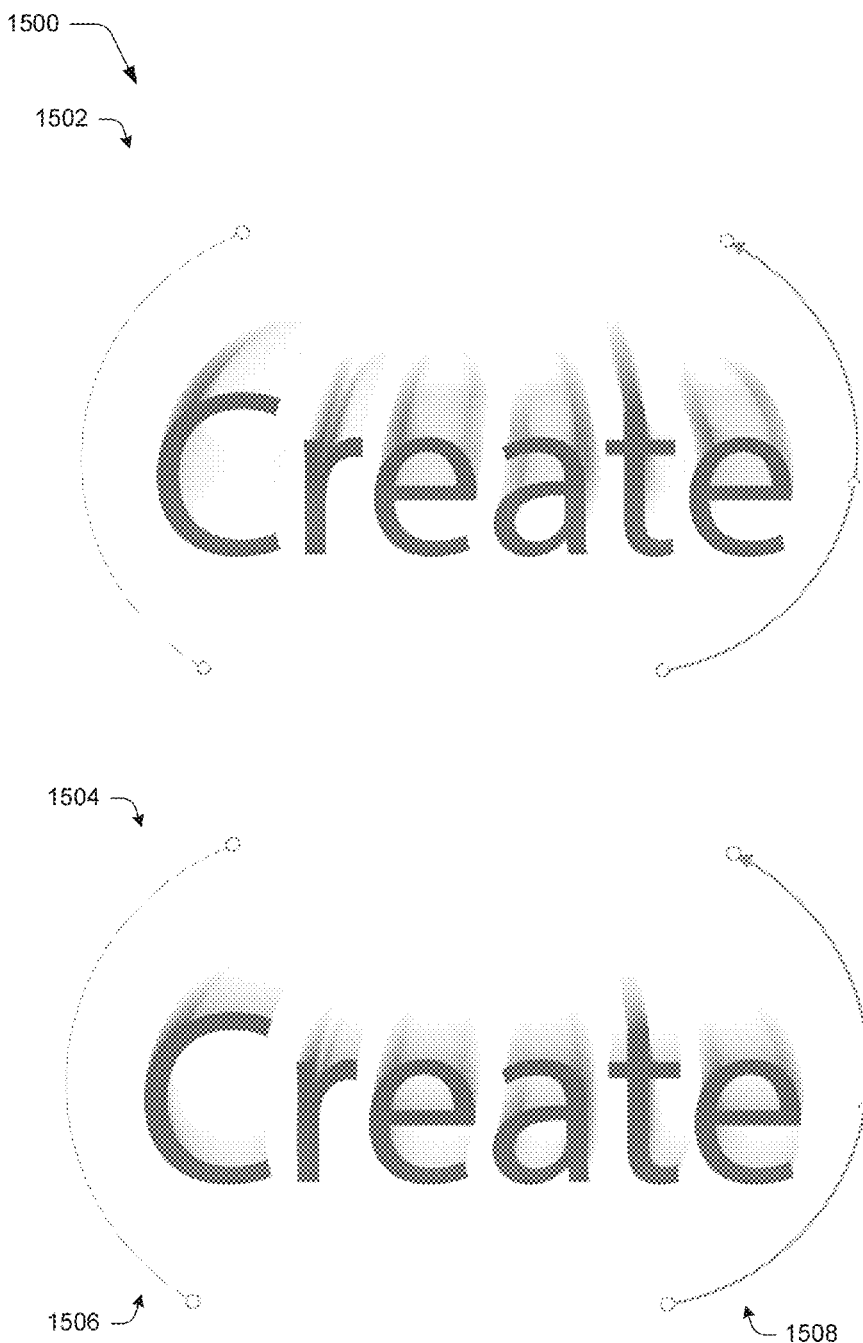
FIG. 15 depicts an example implementation of application of a motion blur effect to an images that includes tapering.

FIG. 15 depicts an example implementation of application of a motion blur effect to an images that includes tapering. A default mode may be specified to simulate a uniform exposure of the image during which various motions take place as indicated by the blur kernels. The blur kernels are determined locally, and may vary potentially from pixel to pixel location in the image as produced by the constrained kernel shape values along the various motion paths. An example of this is shown in image 1502.

A variation of this model is to enable a tapering (e.g., modulation) of the exposure during the simulated time duration, i.e., the motion blur trajectory defined by the path. For example, an exponentially decaying exposure may be used as shown for image 1504, but any function of time may be used, including exponentially growing exposures, periodic exposures, and so on. Thus, tapering may also be used to define the contribution of the image at points in the motion blur trajectory, i.e., the simulated exposure of the motion blur effect.

Image 1504 has an applied motion blur effect defined by paths 1506, 1508, which is the same as those applied to image 1502. In this example, however, tapering of twenty five percent causes the motion blur effect to disappear away from the main text. This example is created by blurring a text layer which is overlaid on top of the original text that is not blurred. Tapering may also be combined with other effects as part of the motion blur effect, an example of which is described as follows and shown in a corresponding figure.

Figure 16:
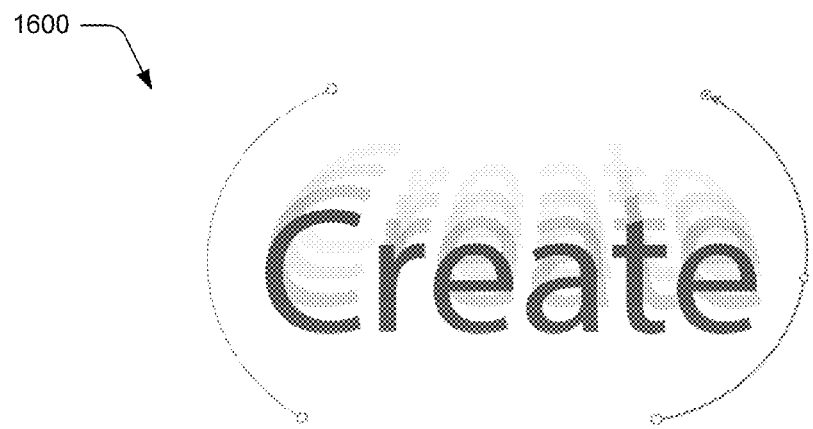
FIG. 16 depicts an example implementation of an image to which a motion blur effect is applied that includes tapering and a flash effect.

FIG. 16 depicts an example implementation of an image 1600 to which a motion blur effect is applied that includes tapering and a flash effect. In this example, four points in time are specified as part of the motion blur trajectory of the path. These four points in time are used to apply a flash effect as previously described, however in this case each of those points in time also specify ambient light illumination effects are not used to show a motion blur between those points in time. A tapered exposure is applied to the flashes to give an effect of each successive flash as fading into the distance. This may be contrasted with the image 1700 of FIG. 17 in which four flashes are also specified but tapering is not employed, i.e., a "flat" exposure is used for each flash.

Figure 18:
FIG. 18 is an illustration of an ambient light contribution combined with flashes and the tapering.

In the example image 1800 of FIG. 18, an ambient light contribution is combined with the flashes and the tapering. Thus, in this example the contribution of the illumination of the image at the four points in time is greater at the four specified points, yet ambient light is also employed to exhibit blur at other points in time in the motion blur trajectory.

Figure 19:
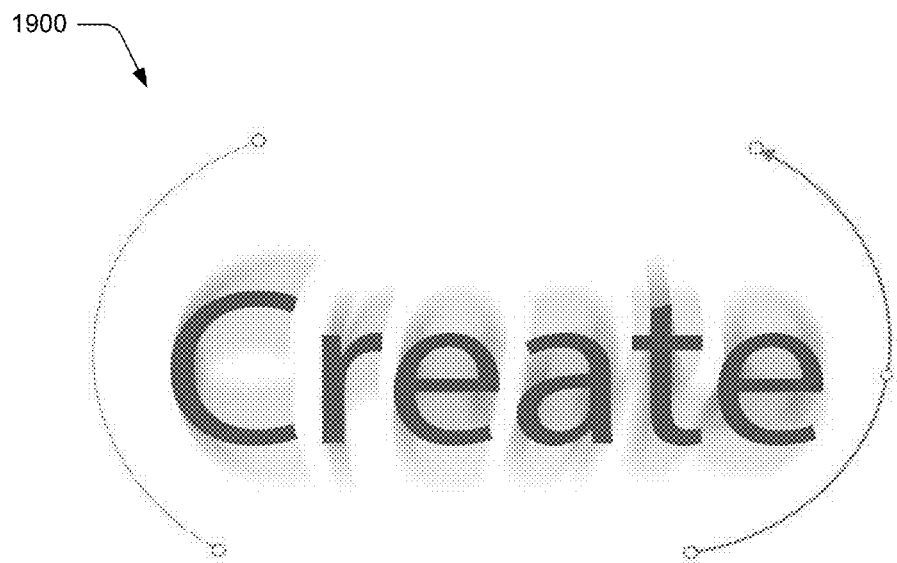
FIG. 19 depict an example implementation showing an image in which positioning of a blur kernel is specified for application as part of a motion blur effect.

FIG. 19 depicts an example implementation showing an image 1900 in which positioning of a blur kernel may be specified for application as part of a motion blur effect. Different forms of image convolution may be supported, which is the term for averaging image values along the motion blur kernel trajectories. A directed blur, as described above, is a first such example in which one endpoint of the blur kernel is anchored to the pixel under evaluation and the motion trajectory is followed along from there to produce the averaged, motion-blurrred pixel value.

A centered approach may also be supported as shown in image 1900, in which the center of mass (centroid of the trajectory) is centered upon the pixel under evaluation. The centered positioning techniques may be used to produce stable motion blurs in the sense that when paths are moved around the image the effect is local to just the regions of the image that are nearby the paths. The non-centered approach provides a more physically realistic method than does the motion blur effect from a single path and may have a larger range of influence upon the rest of the image.

Figure 20:
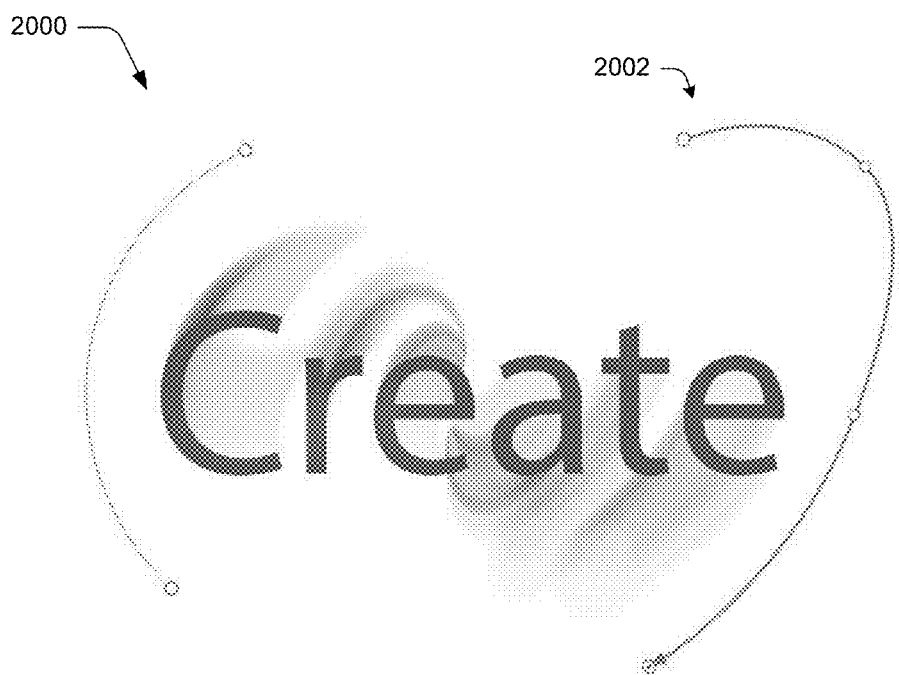
FIG. 20 depicts an example implementation showing an image to which a change has been made to path, thereby showing an effect of a directed blur versus the centered blur of FIG. 19.

FIG. 20 depicts an example implementation showing an image 2000 to which a change has been made to path 2002, thereby showing an effect of a directed blur versus the centered blur of FIG. 19. Other effects may also be applied as part of the motion blur effect.

Figure 21:
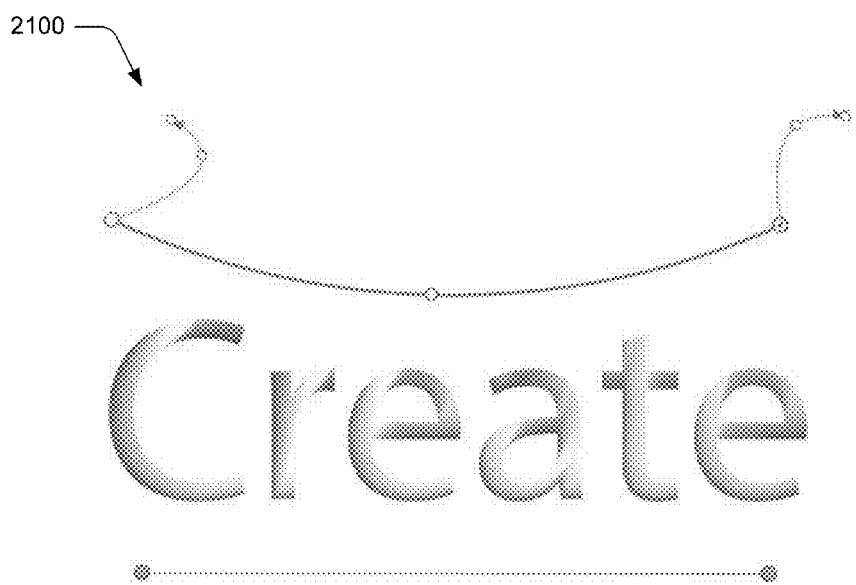
FIG. 21 depicts an example implementation showing an image to which a Bokeh effect has been applied.

FIG. 21 depicts an example implementation showing an image 2100 to which a Bokeh effect has been applied. This effect is produced by boosting image intensities within a selected range (e.g., an upper and/or lower intensity threshold) before blurring. Note that the presence of a null path 2102, which is a path with zeroed out blur kernel shapes, may be used to keep the bottom portion of the text more grounded. In this example, because of the more extreme Bokeh boosting, the motion blur is not as evident within the text itself.

Figure 22:
FIG. 22 depicts another example implementation showing an image of trees to which a Bokeh effect has been applied.

FIG. 22 depicts another example implementation showing an image 2200 of trees to which a Bokeh effect has been applied. As can been seen in the image, boosting of image highlights emphasizes bright streaks which have the shapes of the interpolated blur kernels.

FIG. 23 depicts an example implementation 2300 of a user interface output by the computing device 102 to specify characteristics of flash and taper effects. In this example, the user interface 2302 includes slider controls to specify a flash strength to ambient proportion, a number of flashes, an amount of taper, and a duration of a flash. As is readily apparent, the controls may assume a variety of other configurations without departing from the spirit and scope thereof.

Figure 24:
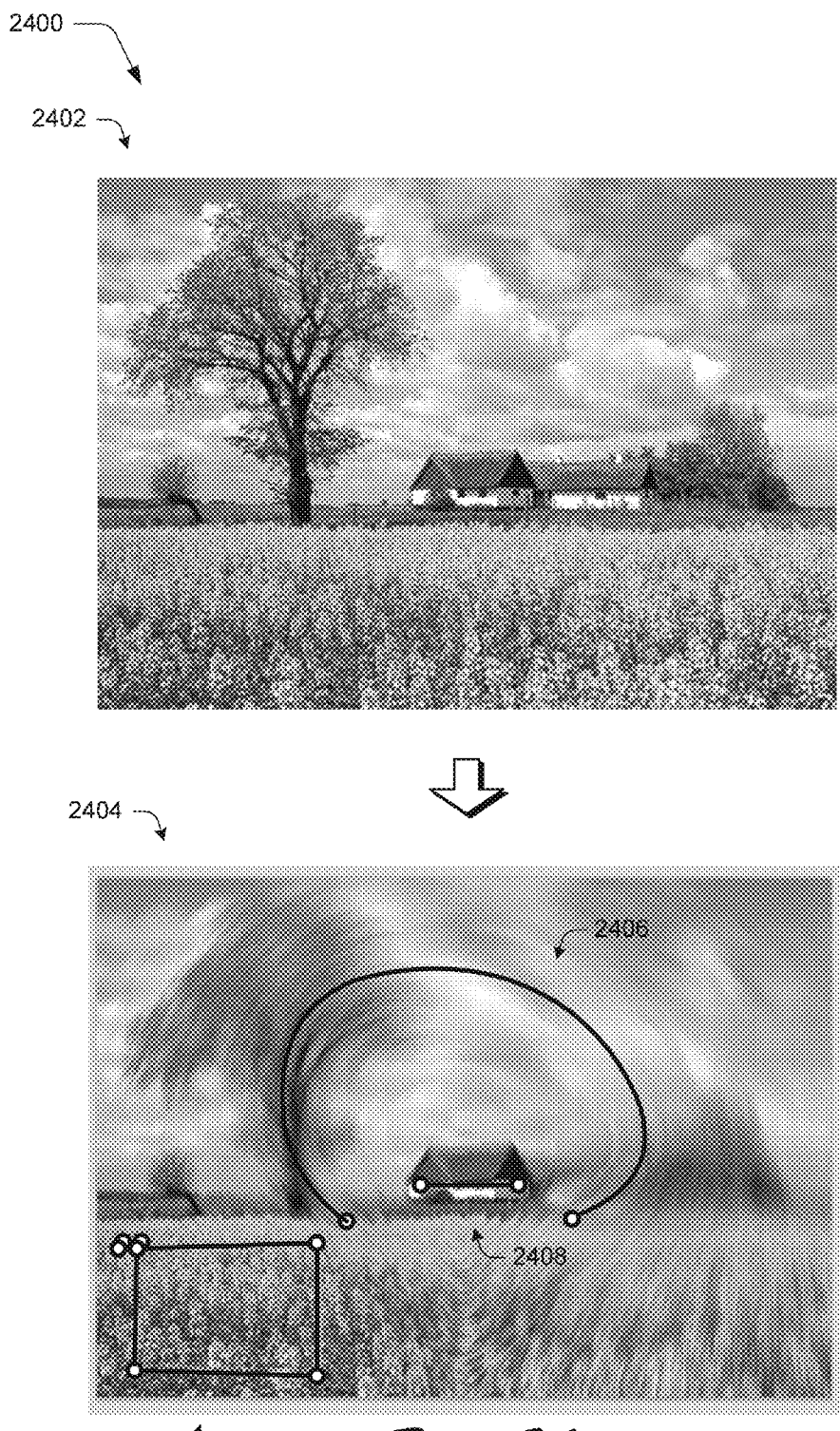
FIG. 24 depicts an example implementation of a motion blur effect that includes a null path.

FIG. 24 depicts an example implementation 2400 of a motion blur effect that includes a null path. The techniques described herein support an ability to "zero out" a blur amount at any endpoint of a path, which may be referred to as a null kernel. When both endpoints on a path are zeroed, this may be referred to as a null path. Null paths may be created in a variety of ways by a user through interaction with a user interface, such as to hold down the control key and double click at the endpoint.

Null paths offer a simple and convenient way to specify regions of an image that are to remain in focus and not have any motion blur applied. Conventionally, this is achieved by first creating a raster mask, such as by painting a gray scale mask in Adobe® Photoshop® and applying this mask or selection to avoid certain areas and allow the effect to be applied in the complementary areas. With a null path this process may be simplified by avoiding the need to create a raster mask. Instead, the regions are determined by the null paths. This provides parametric vector approach to simple region selection that avoids the necessity of a pixel-based raster mask. Additionally, a strength of each null path may be adjusted. For example, a strength may be increased so that the region of no blurring carries more weight and is not overcome by a motion blur effect of other paths in an image.

As shown in FIG. 24, an image 2402 may be processed to form image 2404 through application of a motion blur effect constrained by a path 2406 as previously described. Two null paths 2408, 2410 are also specified in the image 2404. Null path 2408 is positioned over the house and thus restricts the motion blur effect caused by path 2406 from affecting the house. Null path 2410 defines a rectangular region in the lower left of the image 2404 that also prevents application of the motion blur effect from path 2406 to the region defined by the null path 2410.

Thus, null paths 2408, 2410 may be used to avoid motion blur in their vicinity and thus provide a parametric masking techniques may be performed without raster masks. A user may simply draw a path and null out the endpoints to form a null path such that anything in the vicinity stays un-blurred. Thus, these techniques provide for intuitive interaction with real time feedback, further discussion of which may be found in the following section.

Example Procedures

The following discussion describes motion blur curve techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-24.

Figure 25:
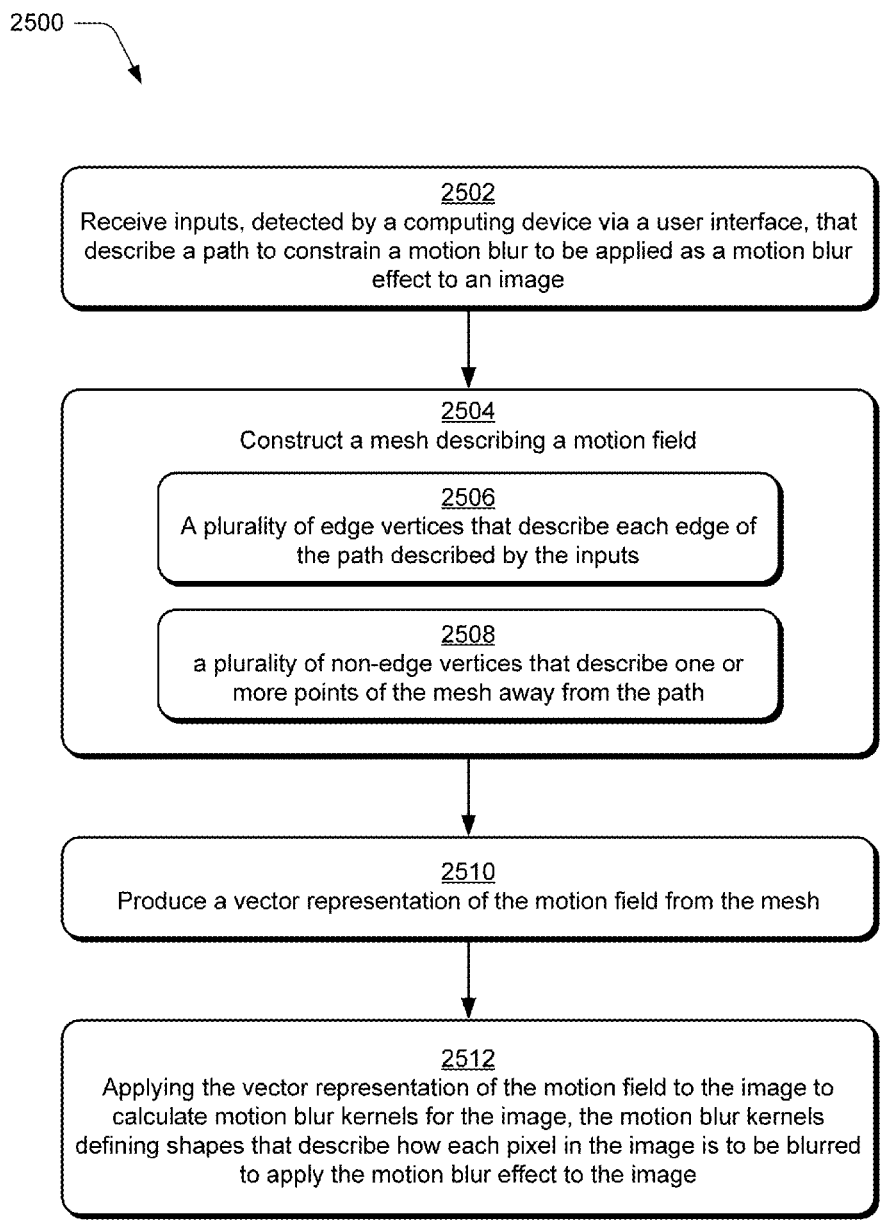
FIG. 25 is a flow diagram depicting a procedure in an example implementation in which a motion blur affect is applied to an image through calculation of a mesh.

FIG. 25 depicts a procedure 2500 in an example implementation in which a motion blur affect is applied to an image through calculation of a mesh. Inputs are received, detected by a computing device via a user interface, that describe a path to constrain a motion blur to be applied as a motion blur effect to an image (block 2502). The inputs may be provided through user interaction with a user interface, such as to draw a path via a gesture, traced using a cursor control device, and so forth.

A mesh describing a motion field is constructed (block 2504). The mesh includes a plurality of edge vertices that describe each edge of the path described by the inputs (block 2506) and a plurality of non-edge vertices that describe one or more points of the mesh away from the path (block 2508). As shown in FIG. 3, for instance, the mesh may be constructed such that each point of the path is represented but points off the path having a greater sparseness than a number of pixels in the image.

A vector representation of the motion field is produced from the mesh (block 2510), such as a vector representation of blur kernel fields 222 of the motion field 220 by the motion field representation module 218 as shown in FIG. 2. The vector representation of the motion field is applied to the image to calculate motion blur kernels for the image. The motion blur kernels define shapes that describe how each pixel in the image is to be blurred to apply the motion blur effect to the image (block 2512). The application of the vector representation, for instance, may be performed by a graphics processing unit 110 and thus may be performed independently of the image to support real time output, an example of which is described in the following.

Figure 26:
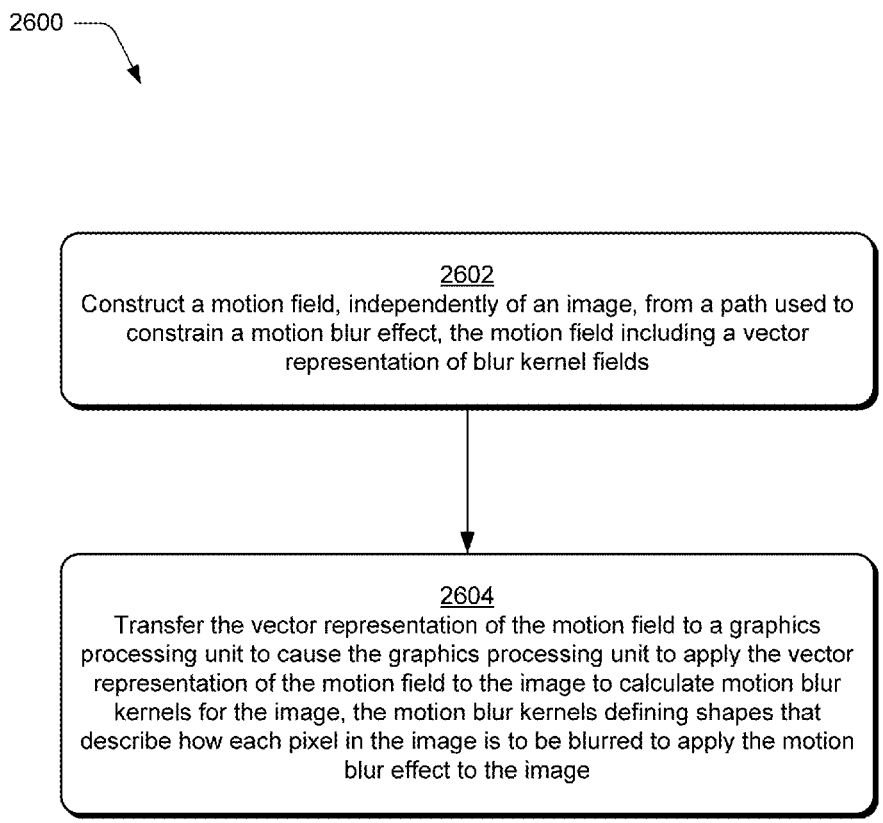
FIG. 26 is a flow diagram depicting a procedure in an example implementation in which a motion field is constructed independently of an image and transferred to the image.

FIG. 26 depicts a procedure 2600 in an example implementation in which a motion field is constructed independently of an image and transferred to the image. A motion field is constructed, independently of an image, from a path used to constrain a motion blur effect, the motion field including a vector representation of blur kernel fields (block 2602). For example, a motion path blur module 118 may be executed by a processing system 106 of a computing device 102 to generate a motion field 220 having a vector representation of blur kernel fields 222.

The vector representation of the motion field is transferred to a graphics processing unit to cause the graphics processing unit to apply the vector representation of the motion field to the image to calculate motion blur kernels for the image. The motion blur kernels define shapes that describe how each pixel in the image is to be blurred to apply to motion blur effect to the image (block 2604). Continuing with the previous example, the motion field 220 may be transferred to a GPU 110. The GPU may then use the motion field 220, along with the image 114, to apply the motion blur effect to the image. In this way, real time output of the image having the applied motion blur effect may be supported.

Figure 27:
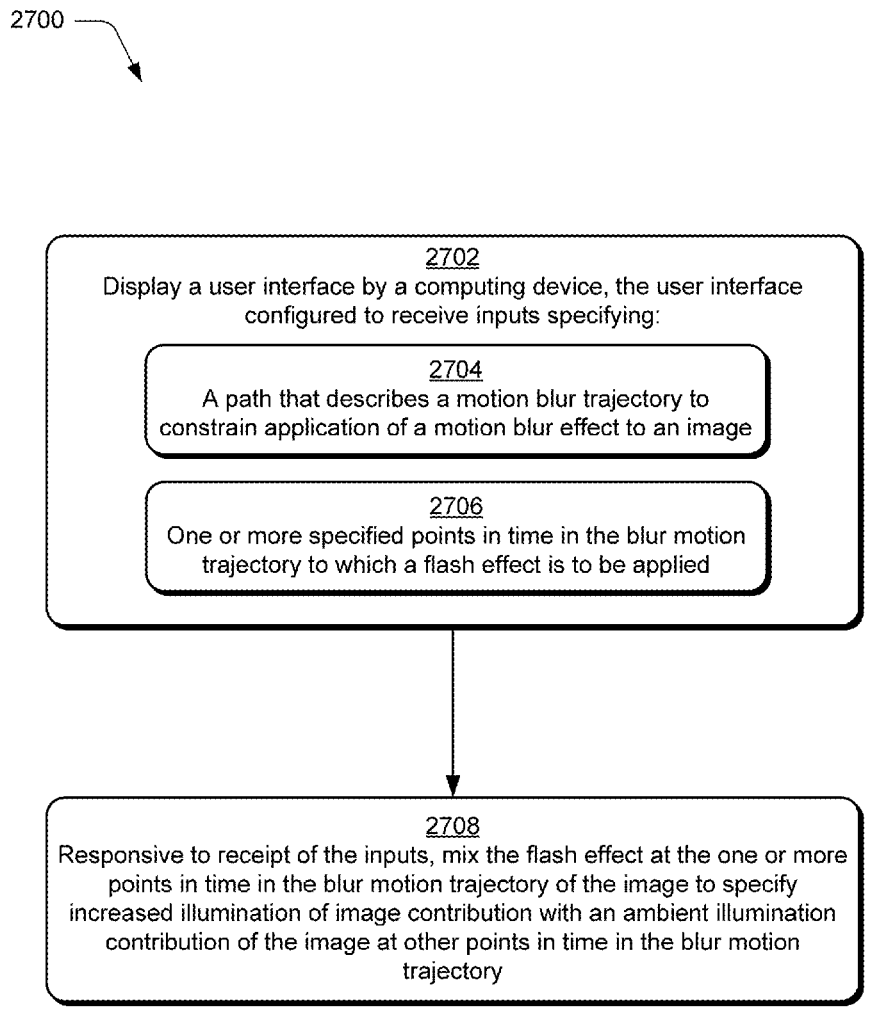
FIG. 27 is a flow diagram depicting a procedure in an example implementation in which a flash effect is applied as part of a motion blur effect.

FIG. 27 depicts a procedure 2700 in an example implementation in which a flash effect is applied as part of a motion blur effect. A user interface is displayed by a computing device, the user interface is configured to receive inputs (block 2702). Inputs are received that describe a path that describes a motion blur trajectory to constrain application of a motion blur effect to an image (block 2704), examples of which are shown in FIG. 1.

One or more specified points in time are also specified by the inputs to which a flash effect is to be applied (block 2706). This may be performed in a variety of ways. For example, a user may interact with the user interface of FIG. 23 to specify a number of flashes. The motion path blur module 118 may then space those flashes evenly in the motion blur trajectory. In another example, a user may specify points on the path itself (e.g., by right-clicking desired points in the path) to have the flash applied at those points in time in the motion blur trajectory. A variety of other examples are also contemplated.

Responsive to receipt of the inputs, the flash effect at the one or more points in time in the motion blur trajectory of the image to specify increased illumination of image contribution is mixed with an ambient illumination contribution of the image at other points in time in the motion blur trajectory (block 2708). As shown in FIG. 18, for instance, four flashes are mixed with an ambient light contribution to form a motion blur effect including a flash effect. As above, this output may be performed in real time such that a user may view application of the motion blur effect along with the flash effects.

FIG. 28 depicts a procedure 2800 in an example implementation in which a path used to constrain a motion blur effect is configured to support direct interaction with the path. A path is displayed in a user interface of a computing device, the path input by a user through interaction with the user interface (block 2802). The path is formed from a plurality of points, each of the points being selectable by a user through interaction with the user interface to modify the path (block 2804). The path is configured to constrain a motion blur to be applied as a motion blur effect to an image (block 2806). For example, conventional techniques used to fit a curve to points generally employed control points to modify a shape of the curve. However, these control points are positioned "off" of the curve and thus it is not intuitive to a user as how modifications of the curve were to be performed. However, in this example a user may interact with any of the points that form the curve to make modifications, such as a "click and drag" using a cursor control device, gesture, and so on.

Responsive to receipt of one or more inputs via the user interface involving movement of at least one point of the path from a first location to a second location in the user interface, the display of the path in the user interface is modified by the computing device to include that at least one point at the second location (block 2808). The curve fitting module 206 of FIG. 2, for instance, may fit a kappa curve 212 to include the point at this new location. Further, as above this may be performed in real time such that the motion blur effect is applied as the point is moved from one location to another.

Figure 29:
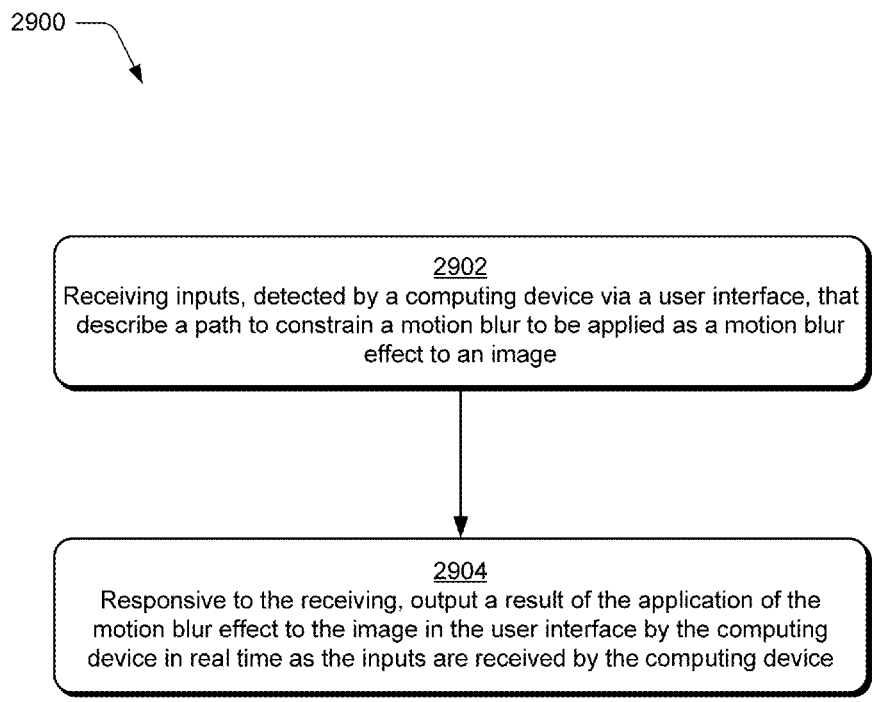
FIG. 29 is a flow diagram depicting a procedure in an example implementation in which a motion blur effect is applied to an image in real time as inputs are received described a path used to constrain the motion blur effect.

FIG. 29 depicts a procedure 2900 in an example implementation in which a motion blur effect is applied to an image in real time as inputs are received that describe a path used to constrain the motion blur effect. Input are received, that are detected by a computing device via a user interface, that describe a path to constrain a motion blur to be applied as a motion blur effect to an image (block 2902). As before, the inputs may be received in a variety of ways, such as via a gesture, cursor control device, specification of points to which a curve is fit, and so on.

Responsive to the receiving, a result of the application of the motion blur effect is output in the user interface by the computing device in real time as the inputs are received by the computing device (block 2904). As previously described, real time output is not supported using conventional techniques, but rather a modal operation is required in which a user input a path and selected a control to cause rendering of the effect, after which a user could view the effect. In this example, however, real time output is supported that is non-modal such that a user may input a path and see the effect as a motion blur effect in real time.

Figure 30:
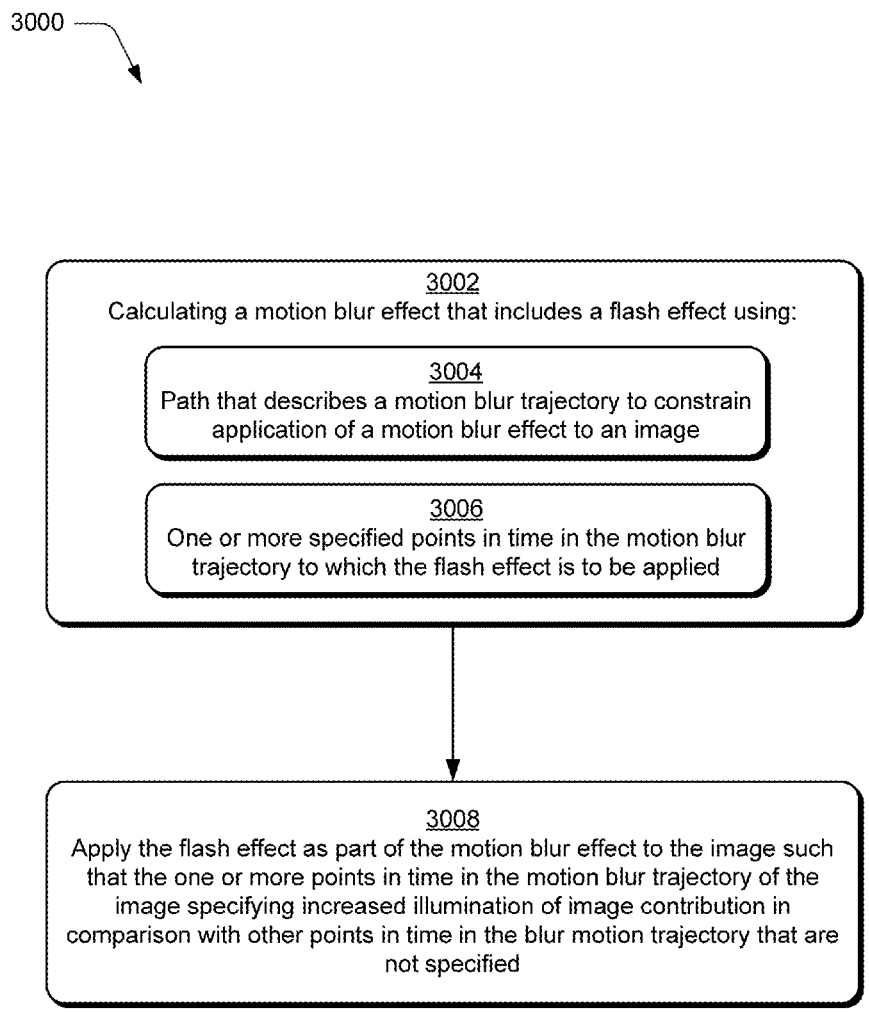
FIG. 30 is a flow diagram depicting a procedure in an example implementation in which a flash effect is applied as part of a motion blur effect.

FIG. 30 depicts a procedure 3000 in an example implementation in which a flash effect is applied as part of a motion blur effect. A motion blur effect is calculated that includes a flash effect (block 3002) using a path that describes a motion blur trajectory to constrain application of a motion blur effect to an image (block 3004) and one or more specified points in time in the motion blur trajectory to which the flash effect is to be applied (block 3006). As described above, these points in time may be specified in a variety of ways, such as through the user interface of FIG. 23, by specifying points along the path itself and thus corresponding points in the described motion blur trajectory, and so forth.

Figure 17:
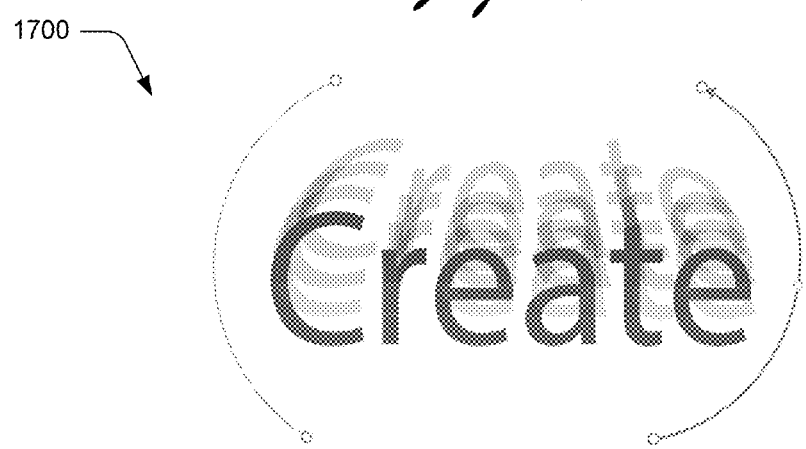
FIG. 17 is an illustration in which four flashes are also specified but tapering is not employed.

The flash effect is applied as part of the motion blur effect to the image such that the one or more points in time in the motion blur trajectory of the image specify increased illumination of image contribution in comparison with other points in time in the motion blur trajectory that are not specified (block 3008). As shown in FIGS. 16-18, this may be used to give increased intensity of the motion blur effect at those points in time to support a variety of interesting image processing effects.

Figure 31:
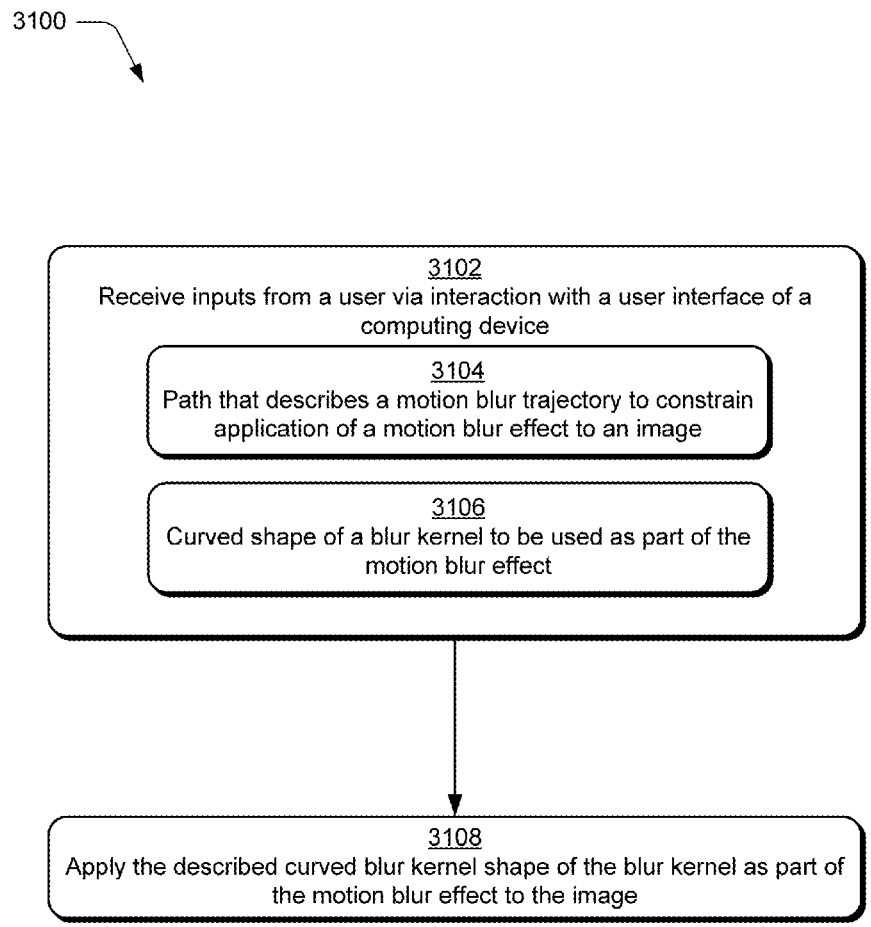
FIG. 31 is a flow diagram depicting a procedure in an example implementation in which a curved blur kernel shape is specified for application as part of a motion blur effect constrained by a path.

FIG. 31 depicts a procedure 3100 in an example implementation in which a curved blur kernel shape is specified for application as part of a motion blur effect constrained by a path. Inputs are received from a user via interaction with a user interface of a computing device (block 3102) that includes a path that describes a motion blur trajectory to constrain application of a motion blur effect to an image (block 3104) as previously described.

The inputs in this example also describe a curved shape of a blur kernel to be used as part of the motion blur effect (block 3106). As shown in FIG. 9, for instance, a user may interact with either endpoint 908, 910 of the path 906 to describe a curved shape. This curved shape may then be applied as part of a motion blur trajectory described by the path, e.g., by smoothly transitioning from one shape to another. Other examples are also contemplated, such as to specify curved blur kernel shapes at any point along the path 906. The described curved blur kernel shape of the blur kernel is then applied as part of the motion blur effect to the image (block 3108), which may be performed as part of real time output as previously described.

Figure 32:
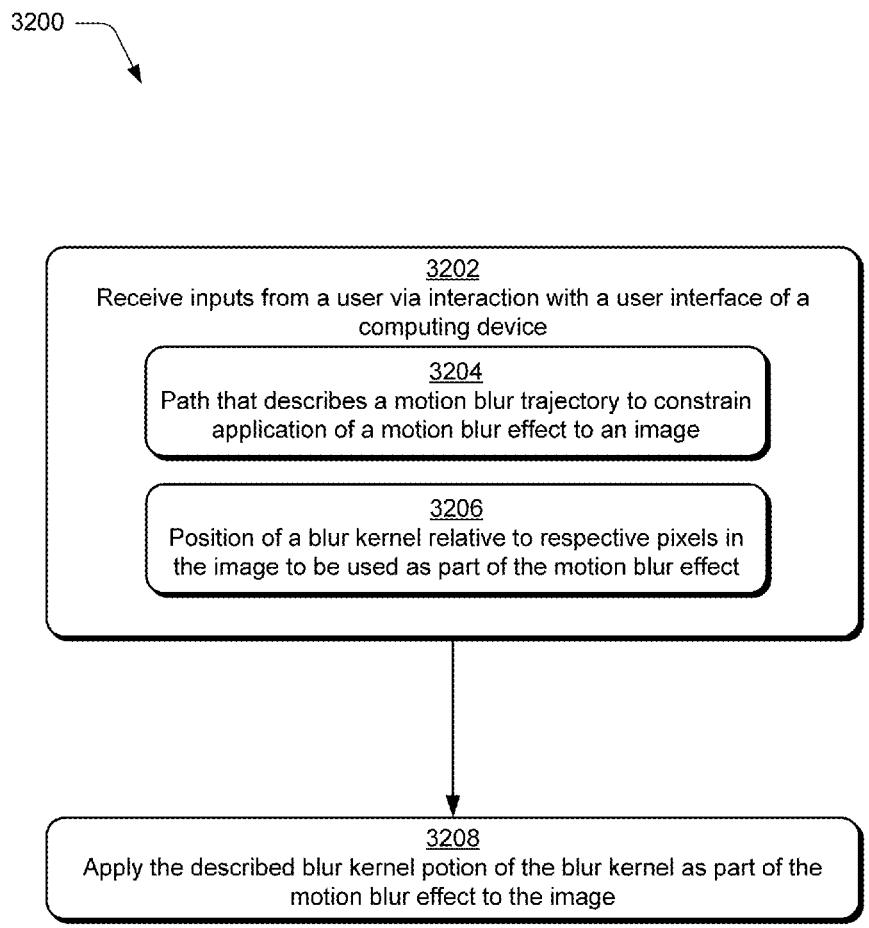
FIG. 32 is a flow diagram depicting a procedure in an example implementation in which a position of a blur kernel is specified for application as part of a motion blur effect constrained by a path.

FIG. 32 depicts a procedure 3200 in an example implementation in which a position of a blur kernel is specified for application as part of a motion blur effect constrained by a path. Inputs are received from a user via interaction with a user interface of a computing device (block 3202) that includes a path that describes a motion blur trajectory to constrain application of a motion blur effect to an image (block 3204) as previously described.

The inputs also describe a position of a blur kernel relative to respective pixels in the image to be used as part of the motion blur effect (block 3206). This may include specification of centered blurring as shown in FIG. 19, directional blurring as shown in FIGS. 16-18, and so on. The described blur kernel position of the blur kernel is applied as part of the motion blur effect (block 3208), which may be performed in real time to provide the desired effect.

Figure 33:
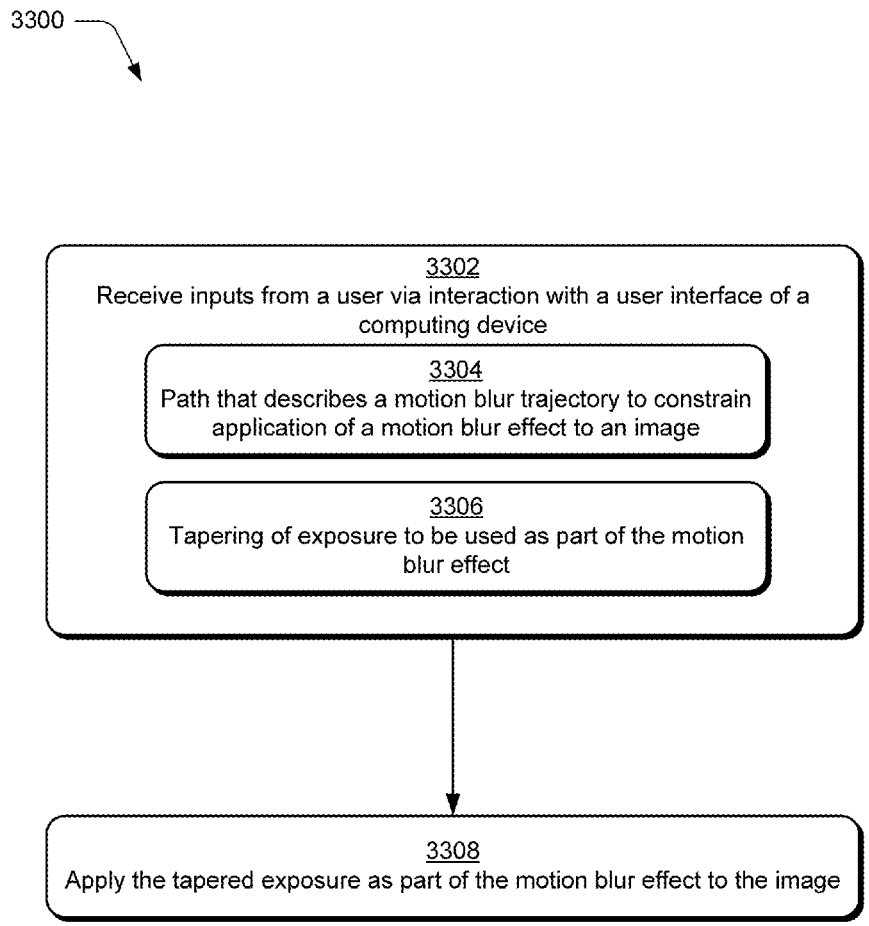
FIG. 33 is a flow diagram depicting a procedure in an example implementation in which tapering of exposure is specified for application as part of a motion blur effect constrained by a path

FIG. 33 is a flow diagram depicting a procedure 3300 in an example implementation in which tapering of exposure is specified for application as part of a motion blur effect constrained by a path. Inputs are received from a user via interaction with a user interface of a computing device (block 3302) that includes a path that describes a motion blur trajectory to constrain application of a motion blur effect to an image (block 3304) as previously described.

Inputs are also received that describe tapering of exposure to be used as part of the motion blur effect (block 3306). This may be applied to flash effects solely as shown in FIG. 16, to ambient light effects alone, or a combination of the two as shown in FIG. 18. The tapered exposure is then applied as part of the motion blur effect to the image (block 3308) as mentioned above.

Example System and Device

Figure 34:
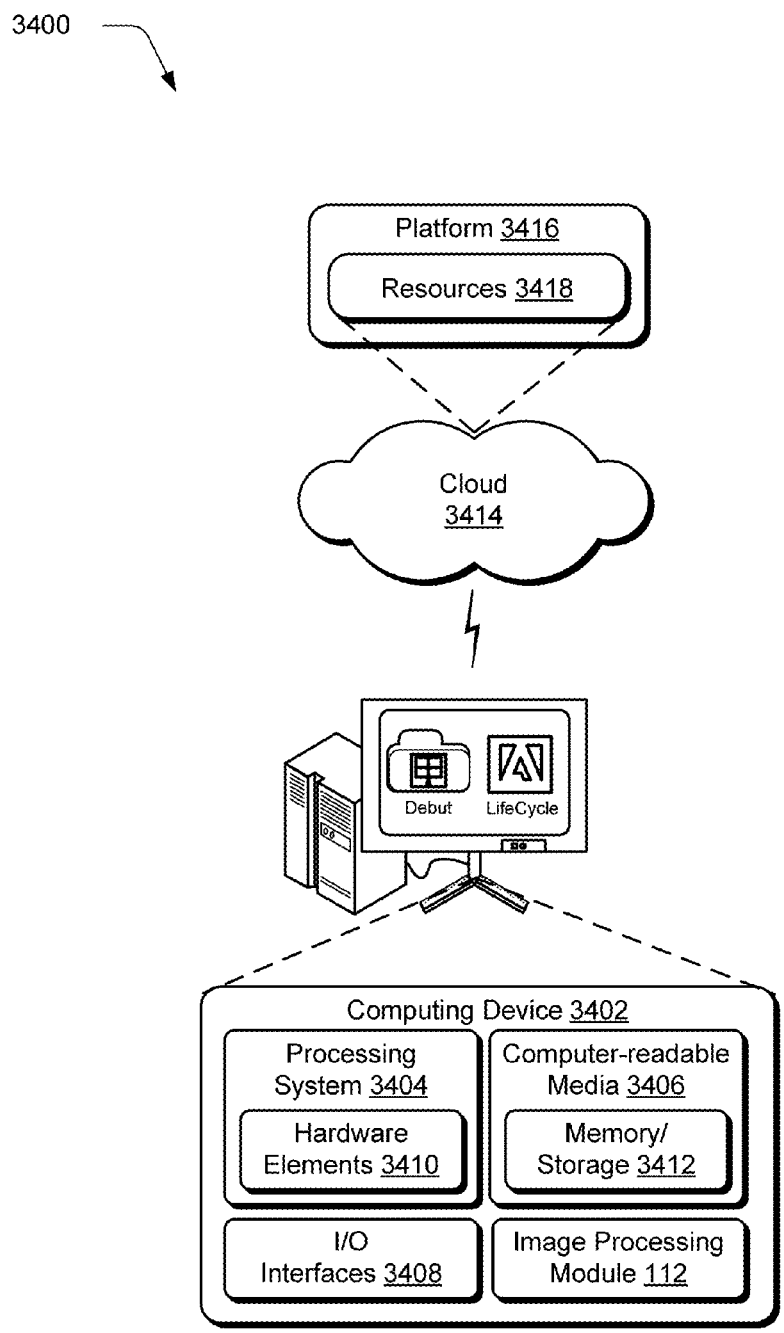
FIG. 34 illustrates an example system including various components of an example device that can be implemented as any type of computing device as described and/or utilize with reference to FIGS. 1-33 to implement embodiments of the techniques described herein.

FIG. 34 illustrates an example system generally at 3400 that includes an example computing device 3402 that is representative of one or more computing systems and/or devices that may implement the various techniques described herein. This is illustrated through inclusion of the image processing module 112. The computing device 3402 may be, for example, a server of a service provider, a device associated with a client (e.g., a client device), an on-chip system, and/or any other suitable computing device or computing system.

The example computing device 3402 as illustrated includes a processing system 3404, one or more computer-readable media 3406, and one or more I/O interface 3408 that are communicatively coupled, one to another. Although not shown, the computing device 3402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 3404 is representative of functionality to perform one or more operations using hardware. Accordingly, the processing system 3404 is illustrated as including hardware element 3410 that may be configured as processors, functional blocks, and so forth. This may include implementation in hardware as an application specific integrated circuit or other logic device formed using one or more semiconductors. The hardware elements 3410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 3406 is illustrated as including memory/storage 3412. The memory/storage 3412 represents memory/storage capacity associated with one or more computer-readable media. The memory/storage component 3412 may include volatile media (such as random access memory (RAM)) and/or nonvolatile media (such as read only memory (ROM), Flash memory, optical disks, magnetic disks, and so forth). The memory/storage component 3412 may include fixed media (e.g., RAM, ROM, a fixed hard drive, and so on) as well as removable media (e.g., Flash memory, a removable hard drive, an optical disc, and so forth). The computer-readable media 3406 may be configured in a variety of other ways as further described below.

Input/output interface(s) 3408 are representative of functionality to allow a user to enter commands and information to computing device 3402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 3402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 3402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 3402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 3410 and computer-readable media 3406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 3410. The computing device 3402 may be configured to implement particular instructions and/or functions corresponding to the software and/or hardware modules. Accordingly, implementation of a module that is executable by the computing device 3402 as software may be achieved at least partially in hardware, e.g., through use of computer-readable storage media and/or hardware elements 3410 of the processing system 3404. The instructions and/or functions may be executable/operable by one or more articles of manufacture (for example, one or more computing devices 3402 and/or processing systems 3404) to implement techniques, modules, and examples described herein.

The techniques described herein may be supported by various configurations of the computing device 3402 and are not limited to the specific examples of the techniques described herein. This functionality may also be implemented all or in part through use of a distributed system, such as over a "cloud" 3414 via a platform 3416 as described below.

The cloud 3414 includes and/or is representative of a platform 3416 for resources 3418. The platform 3416 abstracts underlying functionality of hardware (e.g., servers) and software resources of the cloud 3414. The resources 3418 may include applications and/or data that can be utilized while computer processing is executed on servers that are remote from the computing device 3402. Resources 3418 can also include services provided over the Internet and/or through a subscriber network, such as a cellular or Wi-Fi network.

The platform 3416 may abstract resources and functions to connect the computing device 3402 with other computing devices. The platform 3416 may also serve to abstract scaling of resources to provide a corresponding level of scale to encountered demand for the resources 3418 that are implemented via the platform 3416. Accordingly, in an interconnected device embodiment, implementation of functionality described herein may be distributed throughout the system 3400. For example, the functionality may be implemented in part on the computing device 3402 as well as via the platform 3416 that abstracts the functionality of the cloud 3414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    displaying a path in a user interface of a computing device, the path input by a user through interaction with the user interface, in which:
        the path is formed from a plurality of points, each of the points being selectable by the user through the interaction with the user interface to modify the path; and
        the path is configured to constrain a motion blur to be applied as a motion blur effect to an image;
    responsive to receipt of one or more inputs via the user interface involving movement of at least one point of the path from a first location to a second location in the user interface:
        calculating the motion blur as part of the motion blur effect to transform the image by the computing device independently of a size of the image using the path in a mesh domain separate from an image domain of the image; and
        modifying a display of the image in the image domain in the user interface by the computing device to include the calculated motion blur from the mesh domain as part of the motion blur effect as the movement of the at least one point from the first location to the second location occurs.

2. A method as described in claim 1, wherein the modifying includes fitting a curve to the path to include the at least one point at the second location.

3. A method as described in claim 2, wherein the curve is a kappa curve configured to allow the at least one point to be at any location along the curve.

4. A method as described in claim 1, wherein the one or more inputs describe a drag and drop input.

5. A method as described in claim 4, wherein the drag and drop input is provided using a gesture detected via touchscreen functionality of the computing device or a cursor control device of the computing device.

6. A method as described in claim 1, further comprising displaying a result of application of the motion blur effect to the path in the user interface in real time as corresponding to the movement.

7. A method as described in claim 6, wherein the result is calculated through application of a motion field generated from the path to the image, the motion field generated independent of the image.

8. A method comprising:
    receiving inputs, detected by a computing device via a user interface, that describe a path to constrain a motion blur to be applied as a motion blur effect to an image;
    calculating a result, by the computing device, by applying the motion blur effect to the image to transform the image to include the motion blur effect as the inputs are received, the calculating including:
        generating a motion field independent of the image by constructing a mesh describing the motion field, the mesh including a plurality of edge vertices that describe each edge of the path; and a plurality of non-edge vertices that describe one or more points of the mesh away from the path;
        producing a vector representation of the motion field from the mesh by applying constraints to the plurality of edge vertices, the constraints representing blur kernel parameters along the path; and
        applying a distance-weighted average of the constraints to each of the plurality of non-edge vertices calculated from values of the applied constraints of respective said edge vertices; and
    responsive to the receiving, outputting a result of the application of the motion blur effect to the image in the user interface by the computing device in real time as the inputs are received by the computing device.

9. A method as described in claim 8, wherein the mesh is a triangular mesh.

10. A method as described in claim 8, wherein the motion blur effect comprises a motion field that is calculated independent of the image.

11. A method as described in claim 9, wherein the motion field is then transferred to a graphics processing unit for application of the motion field to the image.

12. A method as described in claim 8, wherein the outputting the result of the application of the motion blur effect to the image in the user interface by the computing device in real time as the inputs are received by the computing device such that the motion blur effect is applied to the image as the path is drawn by a user through interaction with the user interface.

13. A method as described in claim 8, wherein the path is formed from a plurality of points, each of the points being selectable by a user through interaction with the user interface to modify the path further comprising responsive to receipt of one or more other inputs via the user interface involving movement of at least one point of the path from a first location to a second location in the user interface, modifying the display of the path in the user interface by the computing device to include the at least one point at the second location.

14. A system comprising:
one or more modules implemented at least partially in hardware, the one or more modules configured to perform operations comprising:
calculating a motion blur effect that includes a flash effect using:
a path that describes a motion blur trajectory to constrain application of the motion blur effect to an image;
a motion field that is calculated independent of the image; and
one or more specified points in time in the motion blur trajectory to which the flash effect is to be applied;
applying the flash effect as part of the motion blur effect to the image such that the one or more points in time in the motion blur trajectory of the image specifying increased illumination of image contribution in comparison with other points in time in the motion blur trajectory that are not specified; and
outputting the applied flash effect as part of the motion blur effect to the image and rendering the image with the applied flash effect in real time.

15. A system as described in claim 14, wherein the one or more points in time correspond to flashes and the other points in time correspond to ambient light.

16. A system as described in claim 14, wherein the flash effect is applied using tapered exposure modeling to taper exposure of contributions of the flash effect with ambient light contributions.

* * * * *